United States Patent
Larnaout et al.

(10) Patent No.: US 12,361,511 B2
(45) Date of Patent: Jul. 15, 2025

(54) ACCURACY OF GPS COORDINATES ASSOCIATED WITH IMAGE CAPTURE LOCATIONS

(71) Applicant: Matterport, Inc., Sunnyvale, CA (US)

(72) Inventors: Dorra Larnaout, Mountain View, CA (US); Greg Coombe, Mountain View, CA (US)

(73) Assignee: Matterport, Inc., Sunnyvale, CA (US)

( * ) Notice: Subject to any disclaimer, the term of this patent is extended or adjusted under 35 U.S.C. 154(b) by 1060 days.

(21) Appl. No.: 16/271,383

(22) Filed: Feb. 8, 2019

(65) Prior Publication Data
US 2019/0250283 A1 Aug. 15, 2019

Related U.S. Application Data

(60) Provisional application No. 62/628,428, filed on Feb. 9, 2018.

(51) Int. Cl.
*G06T 3/153* (2024.01)
*G01S 19/45* (2010.01)
(Continued)

(52) U.S. Cl.
CPC .............. *G06T 3/153* (2024.01); *G01S 19/45* (2013.01); *G06F 18/2433* (2023.01); *G06N 3/08* (2013.01);
(Continued)

(58) Field of Classification Search
CPC ......... G01S 19/45; G06T 7/74; G06T 3/0081; G06T 3/40; G06T 17/05;
(Continued)

(56) References Cited

U.S. PATENT DOCUMENTS 7,451,549 B1 * 11/2008 Sodhi ................... G01C 17/38
702/92
8,711,206 B2 * 4/2014 Newcombe ............... G06T 7/20
348/46
(Continued)

FOREIGN PATENT DOCUMENTS

WO 2009105603 A1 8/2009
WO 2011069112 A1 6/2011

OTHER PUBLICATIONS

E. Mouragnon, M. Lhuillier, M. Dhome, F. Dekeyser, P. Sayd, "Generic and real-time structure from motion using local bundle adjustment," Image and Vision Computing, vol. 27, Issue 8, 2009, pp. 1178-1193, ISSN 0262-8856, https://doi.org/10.1016/j.imavis.2008.11.006 (Year: 2009).*
(Continued)

*Primary Examiner* — Vladimir Magloire
*Assistant Examiner* — Yonghong Li
(74) *Attorney, Agent, or Firm* — Ahmann Kloke LLP

(57) ABSTRACT

Systems, computer-implemented methods, apparatus and/or computer program products are provided that facilitate improving the accuracy of global positioning system (GPS) coordinates of indoor photos. The disclosed subject matter further provides systems, computer-implemented methods, apparatus and/or computer program products that facilitate generating exterior photos of structures based on GPS coordinates of indoor photos.

26 Claims, 30 Drawing Sheets

(51) Int. Cl.
  *G06F 18/2433* (2023.01)
  *G06N 3/08* (2023.01)
  *G06T 3/40* (2024.01)
  *G06T 7/73* (2017.01)
  *G06T 17/05* (2011.01)
  *G06V 20/10* (2022.01)

(52) U.S. Cl.
  CPC .............. *G06T 3/40* (2013.01); *G06T 7/74* (2017.01); *G06T 17/05* (2013.01); *G06V 20/10* (2022.01); *G06V 20/176* (2022.01); *G06T 2207/10028* (2013.01); *G06T 2207/10032* (2013.01)

(58) Field of Classification Search
  CPC .......... G06T 2207/10028; G06T 2207/10032; G06V 20/176; G06V 20/10; G06K 9/6284; G06N 3/08; G06N 3/0454
  See application file for complete search history.

(56) References Cited

U.S. PATENT DOCUMENTS

| | | | | |
|---|---|---|---|---|
| 10,074,215 | B2* | 9/2018 | Meier | ............... G06T 19/00 |
| 2013/0202197 | A1 | 8/2013 | Reeler | |
| 2014/0300775 | A1* | 10/2014 | Fan | ............... H04N 1/32128 |
| | | | | 348/222.1 |
| 2015/0094089 | A1* | 4/2015 | Moeglein | ............... H04W 4/33 |
| | | | | 455/456.1 |
| 2015/0244935 | A1* | 8/2015 | Meier | ............... G06F 3/017 |
| | | | | 348/372 |
| 2017/0102467 | A1* | 4/2017 | Nielsen | ............... G01S 19/14 |
| 2018/0232948 | A1 | 8/2018 | Hong | |
| 2019/0306424 | A1 | 10/2019 | Boyadzhiev | |
| 2019/0371056 | A1 | 12/2019 | Wetzel | |

OTHER PUBLICATIONS

D. Larnaout, V. Gay-Bellile, S. Bourgeois and M. Dhome, "Vehicle 6-DoF localization based on SLAM constrained by GPS and digital elevation model information," 2013 IEEE International Conference on Image Processing, 2013, pp. 2504-2508, doi: 10.1109/ICIP.2013.6738516 (Year: 2013).*

Dilution of precision (navigation)—Wikipedia.pdf from https://web.archive.org/web/20170930014825/https://en.wikipedia.org/wiki/Dilution_of_precision_(navigation) (Year: 2017).*

Non-Final Office Action for U.S. Appl. No. 16/271,408 dated Sep. 16, 2020, 6 pages.

Notice of Allowance for U.S. Appl. No. 16/271,408 dated Dec. 23, 2020, 7 pages.

Notice of Allowance for U.S. Appl. No. 17/242,285 dated Feb. 6, 2023, 8 pages.

Notice of Allowance for U.S. Appl. No. 17/242,285 dated Oct. 14, 2022, 7 pages.

Non-Final Office Action for U.S. Appl. No. 18/312,935 dated Aug. 29, 2024, 6 pages.

Notice of Allowance for U.S. Appl. No. 18/312,935 dated Feb. 12, 2025, 8 pages.

* cited by examiner

ACCURACY OF GPS COORDINATES ASSOCIATED WITH IMAGE CAPTURE LOCATIONS

CROSS-REFERENCE TO RELATED APPLICATIONS

This application is a U.S. Non-Provisional Patent Application that claims the benefit of priority to U.S. Provisional Patent Application No. 62/628,428, filed Feb. 9, 2018 and titled "IMPROVING ACCURACY OF INDOOR SIGNALS AND SELECTING EXTERIOR PHOTOS BASED THEREON," the entirety of which application is incorporated herein by reference.

TECHNICAL FIELD

This disclosure relates to improving accuracy of global positioning system (GPS) coordinates associated with image capture locations.

BACKGROUND

Sophisticated photography equipment often includes numerous types of sensors for automatically capturing metadata associated with a photo. For example, a camera may include a global positioning system (GPS) receiver, a depth sensor, a magnetometer (a compass), an inertial measurement unit (IMU), and a wireless communication unit (e.g., Wi-Fi radio), and the like for a variety of different applications. These various types of sensors can respectively capture rich metadata regarding the position and orientation of the camera in association with capture of images by the camera. This additional metadata can facilitate various applications, including the generation of a three-dimensional (3D) immersive models of environments based on the captured images, and the geolocation of the images and the 3D models relative to local and global positioning systems to enable tools for visualizing and navigating the 3D models. For example, these tools can include, aerial navigation tools allowing users to virtually explore urban areas in three dimensions from an aerial point of view. These tools can also include, panoramic navigation tools (e.g. street views) allowing users to view multiple 360-degree panoramas of an environment and to navigate between these multiple panoramas with a visually blended interpolation.

Unfortunately, the accuracy of sensor readings may vary significantly based on the environment in which the camera is used. For example, GPS data tends to be significantly more accurate in outdoor environments then indoor environments. Conversely, depth data can be significantly more accurate in indoor environments than outdoor environment due to infrared radiation (IR) interference from sunlight, and the extended distance from the camera depth sensor to any object surfaces.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate improving the accuracy of global positioning system (GPS) coordinates associated with image capture locations are provided.

According to an embodiment, a system is provided that comprises a memory that stores computer executable components, and a processor that executes the computer executable components stored in the memory. The computer executable components can comprise an optimization component that determines optimized location coordinates based on location coordinates generated by a GPS module coupled to a camera in association with capture of images by the camera at different capture locations within an indoor environment, wherein the optimization component determines the optimized location coordinates by adjusting the location coordinates based on aligned positions of the different capture locations with a local 3D system, resulting in the optimized location coordinates. For example, the GPS module can be operatively coupled to the camera, communicatively coupled to the camera, and/or physically coupled to the camera. In various implementations, the aligned positions were determined based on depth data associated with the images as captured at the respective capture locations. The computer executable components further comprise a geolocation component that assigns respective optimized location coordinates of the optimized location coordinates to respective capture locations of the different capture locations.

In some implementations, the location coordinates comprise a subset of second location coordinates selected from a set of first location coordinates that were generated by the GPS module in association with the capture of the images by the camera. In accordance with these implementations, the computer executable components can further comprise a filtering component that selects the subset of second location coordinates based on respective second location coordinates included in the subset meeting a defined precision criterion. For example, the defined precision criterion can comprise a minimum signal-to-noise ratio (SNR) associated with the respective second location coordinates. The defined precision criterion can also comprise a maximum position dilution of precision (PDOP) value associated with the respective second location coordinates.

In one or more implementations, the location coordinates are relative to a global positioning coordinate system (e.g., the location coordinates are GPS coordinates), and wherein the optimization component adjusts the location coordinates as function of a transformation between the local 3D system and the global positioning system. For example, in various implementations, the optimization component adjusts the location coordinates using an optimization problem that optimizes an alignment between the respective capture locations and respective location coordinates of the location coordinates based on the aligned positions of the respective capture locations. The optimization problem can comprise a cost function that penalizes the location coordinates based on radiuses of error associated with the respective location coordinates, wherein the radiuses of error are based on PDOP values associated with the respective location coordinates.

In some implementations, the optimization component can further determine the optimized location coordinates based on orientation information associated with the respective capture locations indicating reference orientation of the respective capture locations relative to the global positioning system. For example, the optimization component can adjust the location coordinates using an optimization problem that optimizes an alignment between the respective capture locations and respective location coordinates of the location coordinates based on the aligned positions of the respective capture locations and the reference orientations associated with the respective capture locations. The optimization problem can comprise a cost function that penalizes the respective location coordinates based on differences between the reference orientations and actual orientations of the respective location coordinates relative to the global positioning coordinates system. In accordance with these implementations, the orientation information can include magnetometer data generated by a magnetometer coupled to the camera, and the computer-executable components can further comprise a calibration component that calibrates the magnetometer data to transform the magnetometer data into the orientation information. For example, the calibration component can calibrate the magnetometer data based on at least one of: relative tilt of the magnetometer to a ground plane, hard iron effect, or soft iron effect.

In some embodiments, elements described in connection with the system can be embodied in different forms such as a computer-implemented method, a computer program product, or another form.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
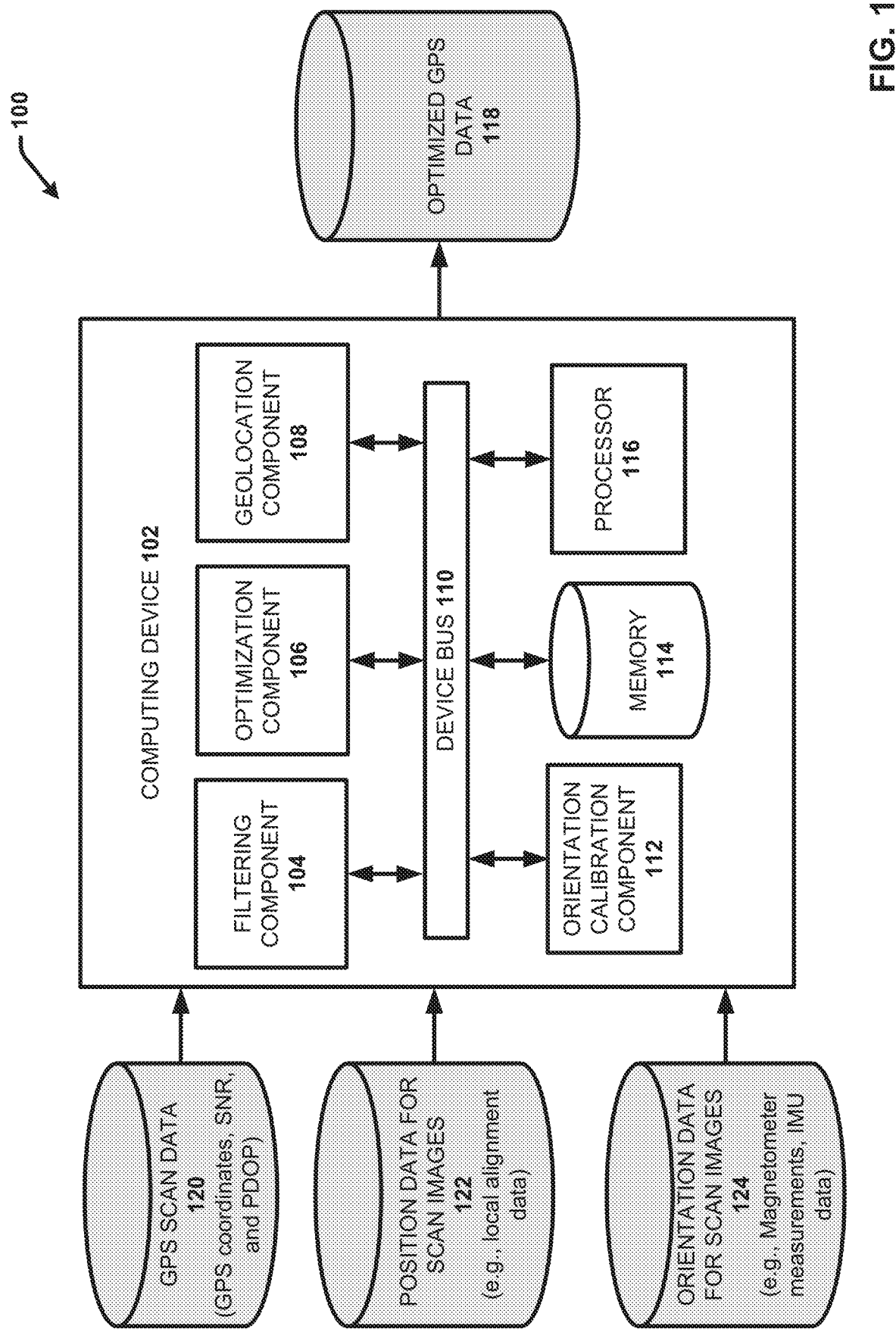
FIG. 1 illustrates a high-level block diagram of an example system for improving the accuracy of global positioning system (GPS) coordinates of indoor photos in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure provides systems, computer-implemented methods, apparatus and/or computer program products that facilitate improving the accuracy of global positioning system (GPS) coordinates of indoor photos. The disclosed subject matter further provides systems, computer-implemented methods, apparatus and/or computer program products that facilitate generating exterior photos of structures based on GPS coordinates of indoor photos.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. The following detailed description is divided into three sections. Section I is directed to techniques for improving the accuracy of GPS coordinates of indoor photos. Section II is directed to techniques for automatically generating external images of structures. Section III describes an example operating environment in which one or more embodiments described in Section I and Section II can be facilitated.

I—Improving the Accuracy of GPS Coordinates of Photos

Various location-based applications and services utilize GPS coordinates associated with real-world physical objects (e.g., buildings, structures, etc.) to seamlessly geolocate these physical objects in universal global system. For example, virtual tours are used in industries like real estate, retail, restaurants, and more using modeled 3D immersive spaces of houses, buildings, shopping centers and the like. Because they represent real places, it is desirable to associate an accurate GPS location in the metadata for each 3D space. Accurate GPS locations associated with modeled real-world environments can thus be used to syndicate 3D models for these environments in a global geolocation database. An accurate GPS location associated with a 3D model is important because customers often use the virtual tour of the 3D model as a marketing tool to drive real-world traffic to the space. In real estate, this means more visits to an open house. For a museum or restaurant, this means more paying visitors.

However, because GPS coordinates captured indoors tend to be inaccurate, it is difficult to determine and associate accurate GPS coordinates with specific locations inside a modeled 3D environment corresponding to a real-world environment. As a result, various location-based applications that employ GPS coordinates to geolocate precise locations of indoor objects are hindered. For example, in addition to a single GPS coordinate location for a building corresponding to a street address for the building, in order to properly align indoor and outdoor images of the building to one another and a universal global positioning system, it is useful to obtain accurate GPS coordinates corresponding to the capture location of each indoor and outdoor image.

The disclosed subject matter provides technique for determining optimized GPS coordinates generated by a GPS module coupled to a camera in association with an image scan of the environment, for example, for purposes of employing the images to generate a 3D model of the environment. The disclosed techniques can be used to generate optimized GPS coordinates for each image (or in some implementations one or more) captured by the camera during the scan, including indoor and outdoor images. As used herein, the term "scan" refers to a capture process that involves capturing images (e.g., two-dimensional images) and positional data for the images (e.g., depth data using one or more depth sensors, GPS coordinates using a GPS module, etc.) at various nearby locations/positions in an environment to generate a 3D model of the environment. In particular, an immersive 3D model of an environment can be generated based on images captured of the environment and positional metadata associated with the images captured by sensors coupled to the camera. This positional metadata can include depth data captured by one or more depth sensors (e.g., a structured light sensor device, a time-of-flight depth detection device, and a light imaging detection and ranging (LiDAR) device, a stereo camera, etc.). A 3D model of the environment can be generated by aligning the images to one another relative to a local 3D coordinate space using the positional metadata associated therewith.

For example, in various implementations, to generate a 3D model of a house, a building, or another structure that includes an indoor space, a camera operator can first place the camera on top of a tripod and initiate a scan using controls on either the camera or a communicatively coupled device (e.g., a mobile computing device such coupled to the camera). The camera operator can then cause the camera to rotate 360°, capturing visual image data (e.g., one or more two-dimensional images) and 3D (3D) data (e.g., depth data) over the course of rotation. The captured data can be combined to generate a 360° panoramic image of the environment with depth data at the scan position/location. The camera operator can then move (or cause the camera to move via a robotic mount) to a new position in the environment and direct the camera to capture a second panoramic image and corresponding panoramic depth data at the new position. The depth data from the second scan can be used to align (place) the second scan in relation to the first scan. This process can be repeated until there are many scans (inside or both inside and outside of the structure) that can be combined together to create a 3D model of the environment. In other implementations, a user can employ a handheld mobile camera and conduct a scan of the building in a walk-through manner while capturing images at various locations throughout the building. Depth data captured for the respective images can be used to align the images to one another and a common 3D system.

Although the relative positions of the image scans relative to one another and a local 3D coordinate space can be determined based on the depth data for each scan, without any extra information, the aligned positions of the images relative to a real-world system (e.g., a GPS system) is unknown. For example, without any extra information, the resulting 3D model can correspond to an excellent local 3D map of the 3D model itself, but the particular direction of the 3D model relative to north, south, east, and west is unknown. In this regard, based on the local alignment alone, one would be unable to determine whether the front door of the house faces north or south. In addition, while a user can manually input a real-world physical address associated with the 3D model of the house, the user may omit to provide this information or provide incorrect information.

To address this issue, a GPS module can be coupled to the camera to capture GPS data over the course of the scan in addition to the image data and the depth data. However, as mentioned above, GPS information captured from interior locations tends to be inaccurate. Therefore, it is desirable to provide techniques for improving the accuracy of indoor coordinates. It is appreciated that other methods for determining location coordinates, such as Wi-Fi assistance or cellular radio cell tower triangulation, could also provide inaccurate location information that could benefit from such techniques. In this regard, the various techniques described herein for optimizing GPS coordinates can be applied to optimize position/location coordinates determined using other locating techniques other that GPS (e.g., Wi-Fi, assisted GPS (AGPS), triangulation, or the like).

FIG. 1 illustrates a block diagram of an example, non-limiting system 100 that facilitates improving the accuracy of GPS coordinates of indoor photos (i.e., 2D images) in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, in the embodiment shown, system 100 includes a computing device 102 that includes several machine-executable components, including (but not limited to), filtering component 104, optimization component 106, geolocation component 108, and orientation calibration component 112. System 100 also includes various data sources and/or data structures comprising information that can be used/evaluated by one or more components of the computing device 102 and/or generated by one or more components of computing device 102. For example, in the embodiment shown, these data sources and/or data structures include GPS scan data 120, position data for scan images 122, orientation data for scan images 124 and optimized GPS data 118. The computing device 102 can further include or be operatively coupled to at least one memory 114 and at least one processor 116. The at least one memory 114 can further store executable instructions (e.g., the filtering component 104, the optimization component 106, the geolocation component 108, and the orientation calibration component 112), that when executed by the at least one processor 116, facilitate performance of operations defined by the executable instruction. In some embodiments, the memory 114 can also store the various data sources and/or structures of system 100 (e.g., the GPS scan data 120, the position data for scan images 122, the orientation data for scan images 124 and the optimized GPS data 118, and the like). In other embodiments, the various data sources and structure of system 100 can be stored in other memory (e.g., at a remote device or system), that is accessible to the computing device 102 (e.g., via one or more networks, such as the Internet, an intranet, or the like). Computing device 102 can further include a device bus 110 that couples the various components of the computing device to one another. Examples of said processor 116 and memory 114, as well as other suitable computer or computing-based elements, can be found with reference to FIG. 30, and can be used in connection with implementing one or more of the systems or components shown and described in connection with FIG. 1 or other figures disclosed herein.

The GPS scan data 120 can include raw GPS measurements captured by a GPS module (e.g., including hardware and/or software) coupled to a camera that captured images in association with a scan of an environment (e.g., a scan of the interior and optionally the exterior of a house, building, or another suitable structure). In this regard, the GPS module can include a GPS module that was located on, within or near (at known distance/position of relative to) the position of the camera in association with movement of the camera over a scan. For example, in some implementations the GPS scan data 120 can include GPS data captured by a GPS module that is integrated on or within the camera. In other implementations, the GPS scan data 120 can include GPS data captured by a GPS module that is separated from the camera yet physically coupled to the coupled to the camera via another object or entity. For example, the GPS module can include a GPS module of a vehicle that also include the camera. In another example, the GPS module can include a GPS module of a mobile device worn by or held by (e.g., in hand, in clothing pocket, etc.) an operator of the camera. In another example, the GPS module can include a GPS module coupled to a tripod or robotic mount to which the camera is attached during the scan. The GPS module can thus include a GPS module that was operatively coupled to the camera, communicatively coupled to the camera, and/or physically coupled to the camera in association with image capture by the camera over a scan. In some implementations, the GPS scan data 120 can include raw GPS measurements captured by the GPS module at each capture location for each scan image (e.g., each panoramic image captured at a specific position in the environment). In other embodiments, the GPS module can regularly and/or continuously capture GPS scan data 120 over the course of a scan (e.g., the GPS antenna can receive measurements the entire time the camera is turned on; not just when the camera is actually capturing images data). In this regard, the GPS module can regularly and/or continuously capture GPS measurements during image capture at fixed or precise capture locations in the environment, as well as between captures (e.g., during movement from one capture position to the next).

The GPS scan data 120 can include at least raw latitude and longitude coordinates values/measurements relative to a global coordinate positioning system. In some embodiments, the GPS scan data 120 can also include additional measurement that can be used to evaluate the accuracy of the latitude and longitude coordinates. For example, GPS modules can produce data as a series of messages containing location information and other information. The most important part of the message is the latitude and longitude, but these values alone don't give sufficient information to determine the accuracy of the measurement. Thus, in some embodiments, each GPS coordinate measurement (or in some implementations one or more) can be associated with additional data that can be used to determine the accuracy of the GPS coordinates. In some implementations, this additional data can include signal-to-noise ratio (SNR) values captured in association with respective GPS latitude and longitude coordinates. The SNR value represents the level of the GPS signal over the level of background noise at the time of calculation of the GPS coordinates. A higher SNR value means a stronger GPS signal relative to the background noise and thus a more accurate GPS coordinate location calculation (e.g., the higher the SNR the better). This additional data can also include position dilution of precision (PDOP) values captured in association with respective GPS coordinates. The PDOP values reflect the accuracy of the GPS coordinate calculations based on the relative positions of the satellites that were used to determine the GPS coordinate calculations. For example, a PDOP value of 0 to 2 reflects a highest possible confidence level of accuracy, a PDOP value of 2 to 3 indicates a medium level of accuracy required for most sensitive applications, and a PDOP value of 3 to 6 indicates a minimum level for mapping applications and business decisions. It can be appreciated that GPS modules produce many variations of data types related to location and accuracy, and that SNR and PDOP represent one embodiment.

The position data for scan images 122 can include information regarding aligned positions of the scan images to one another and a local 3D coordinate space. As used herein, the term "scan images" refers to the respective images captured over a course of a scan of an environment. Scan images can include indoor and outdoor images. In various embodiments, each of the scan images are 360° panoramas captured or generated (e.g., via combining two or more images together whose combined FOVs are 360°) in association with rotation of the camera 360° at each capture position. In other embodiments, the scan images can have vertical and/or horizontal fields of view that are less than 360°. As discussed above, in association with generating a 3D model of an environment, depth data can be captured (or determined) for respective images captured at each capture location throughout the environment. This depth data can be used to align each image to one another relative to a common 3D coordinate space/system. The final 3D model can be generated based on a global alignment of all scan images relative to one another and the common 3D coordinate space. Accordingly, the aligned positions of respective scan images can correspond to the capture locations of each scan image relative to one another and the common 3D coordinate space. For example, the aligned positions can include "x, y and z" coordinates relative to the common 3D coordinate space. The aligned position data for the scan images is also referred to herein as local alignment data. In some implementations, the position data for scan images 122 can also include the raw depth data associated with each scan image, information identifying distances between the capture locations of scan images and/or information identify relative orientations of capture locations of scan images to one another and the common 3D coordinate space.

The orientation data for scan images 124 can include information indicating a reference orientation of each scan image location/position relative to the global positioning system. For example, the reference orientation can comprise a directional vector that indicates a cardinal direction (e.g., north, south, east, or west) relative to the aligned capture location/position of each image. In various embodiments, the reference orientation used is the direction north estimated based on magnetometer readings and IMU data captured in association with a scan. In particular, in addition to a GPS module, the camera used to conduct the scan (e.g., to capture the scan images) can also have a magnetometer (e.g., an apparatus that provides compass functionality to detect the earth's magnetic field) integrated therein or thereon. The magnetometer can provide information that indicates the relative orientation (e.g., the direction north) of the capture position of the camera for each scan image. Because the global positioning coordinate system is aligned with and based on the True North of the cardinal directions (e.g., east, north, up (ENU) coordinates), the reference orientation information associated with each scan image capture position/location can be used to determine the relative direction of each scan image capture position/location within the global positioning system. Techniques for estimated this reference orientation information are discussed in greater detail infra.

The optimized GPS data 118 can include optimized GPS coordinates (e.g., latitude and longitude values), relative to the global positioning coordinate system, for each (or in some implementation one or more) of the capture locations (or aligned positions) of the scan images. For example, the optimized GPS data 118 can include information that identifies each (or in some implementations one or more) scan image (e.g., by a suitable image identifier), and optimized GPS coordinates determined for each scan image. As used herein, GPS coordinates that are referred to as "optimized" GPS coordinates reflect GPS coordinates derived from raw GPS coordinates (e.g., provided by the GPS scan data 120) in accordance with the optimization techniques described herein, wherein the optimized GPS coordinates have a higher degree of precision or accuracy relative to the raw GPS coordinates. In some embodiments, the optimized GPS data 118 can also include the position data for each scan image relative to the local coordinated system used to align the scan images to one another in association with generation of a 3D model therefrom. For example, the position data can include the information provided by the position data for scan images 122 that identifies the aligned position of the scan image relative to the local 3D coordinate system, which corresponds to the capture location of the scan image relative to the local 3D coordinate system. In this regard, in addition to aligned position data for each scan images that reflects its capture location relative to a common 3D coordinate space, each scan image can be associated with optimized GPS coordinates (e.g., that include a latitude and a longitude value) corresponding to the capture location of the scan image relative to the global positioning system. As discussed in greater detail infra, the optimized GPS coordinates associated with each scan image (e.g., the information defining the optimized coordinates matched to scan image positions 118) can be determined by the filtering component 104 and the optimization component 106 using an optimization process that employs a cost function to transform the (raw) GPS scan data 120 into more accurate measurements based on the position data for the scan images 122 and the orientation data for the scan images 124.

In this regard, a primary goal of system 100 is to match each image scan position with an accurate GPS latitude and longitude value and storing the accurate latitude and longitude value with the image/capture location of the image to generate the optimized GPS data 118. Due to the inaccuracy of the raw GPS data generated during the scan, each scan position may be associated with a plurality of GPS measurements with varying degrees of accuracy. Accordingly, the filtering component 104 and the optimization component 106 can facilitate refining the (raw) GPS scan data 120 to generate the optimized GPS data 118, which includes optimized GPS coordinates matched to each (or in some implementations one or more) scan image capture location (which corresponds to the aligned position of the scan image relative to the local 3D coordinate system).

In one or more embodiments, the filtering component 104 can facilitate converting the raw GPS coordinates included in the GPS scan data 120 into optimized GPS data by initially removing "bad" GPS data from the GPS measurements included in the GPS scan data 120 for a scan. In this regard, "bad" GPS data refers to GPS measurements that fail to meet a minimum level of accuracy based on one or more defined accuracy criterion. For example, as noted above, in some implementations, the GPS scan data 120 can include GPS coordinate measurements captured over a period of time in which the GPS module is turned on. As a result, the GPS coordinate measurements can include a plurality of GPS measurements captured in association capture of image data by the camera (e.g., to combine into a panoramic image) over a period of time during rotation of the camera at a fixed capture location. In some implementations, the GPS scan data 120 can also include GPS data captured not only at the time of image capture by the camera, but between image captures (e.g., in association with movement of the camera throughout the environment). Thus, a plurality of GPS measurements of varying degrees of accuracy included in the GPS scan data 120 can be associated with a single scan image capture location.

Figure 2:
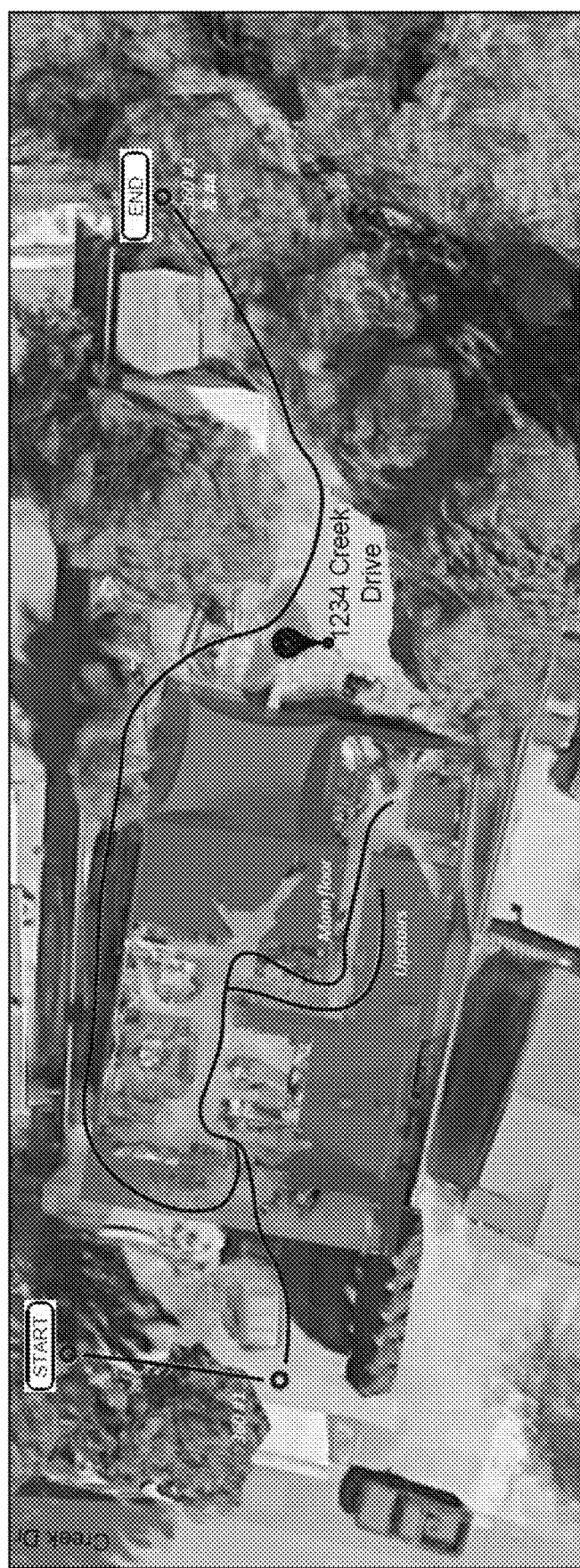
FIG. 2 provides an image illustrating an actual path taken by a camera operator in association with an image scan of a property in accordance with one or more embodiments described herein.

For example, FIG. 2 provides an image illustrating an actual path taken by a camera operator in association with an image scan of a property in accordance with one or more embodiments described herein. As shown in FIG. 2, the camera operator started outside the front of the house, moved into the house (through the front door) and around different areas/rooms of the house, and then exited the house (through the front door) and traveled around the side of the house to reach the back perimeter of the property (in the back yard). In some accordance with this example implementation, the camera operator stopped at various (fixed) locations along this path to capture images (e.g., 360° panoramas) of the interior (and optionally the exterior) of the house. In addition, a GPS module coupled to the camera was used to capture a plurality of GPS measurements over the course of the scan.

With reference to FIGS. 1 and 2, in one or more embodiments, the filtering component 104 can filter the collection of GPS measurements captured during a scan (e.g., along the scan path depicted in FIG. 2) to remove GPS measurements that fail to meet a minimum level of accuracy based on the SNR values respectively associated with the GPS data. Higher SNR values indicate a higher level of accuracy. Thus, with these embodiments, the filtering component 104 can employ a minimum SNR value as a filter criterion to select only those GPS measurements that have SNR values which exceed the minimum SNR value. For example, in some embodiments, the minimum SNR can be set to 25.0 decibels (dB). In other embodiments, in addition to or alternative to the SNR criterion, the filtering component 104 can filter a set of GPS measurement based on the PDOP values respectively associated therewith. Lower PDOP values indicate a higher level of accuracy. Thus, with these embodiments, the filtering component 104 can employ a maximum PDOP value as a filter criterion to select only those GPS measurement that have PDOP values that are less than or equal to the maximum PDOP value (e.g., 6.0 for example).

Figure 3:
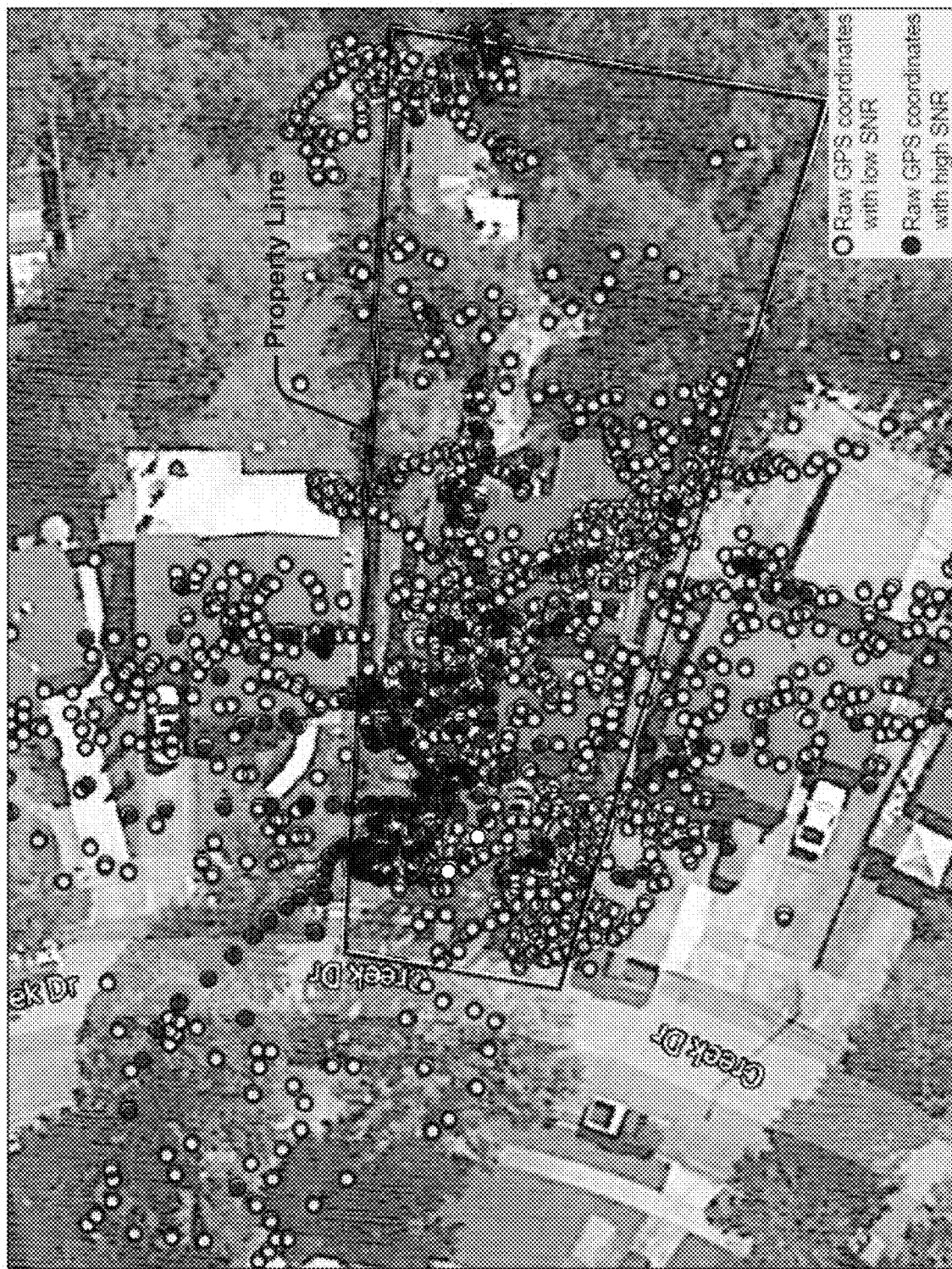
FIG. 3 illustrates the raw GPS data captured in association with the image scan of the property in accordance with one or more embodiments described herein.

FIG. 3 illustrates the raw GPS data captured in association with the image scan of the property shown in FIG. 2, in accordance with one or more embodiments described herein. In the image shown in FIG. 3, the respective circles overlaid onto the aerial view of the property correspond to raw GPS measurements. As can be seen by comparison of the actual scan path shown in FIG. 2 with the GPS measurements shown in FIG. 3, many GPS measurements were captured at locations that stray from the actual scan path. In the embodiment shown, the "bad" GPS measurements with low SNR values (e.g., less than or equal to 25.0 dB) are represented by the white circles. The black circles correspond to "good" GPS measurement with high SNR values (e.g., greater than 25.0 dB). In this regard, the black circles correspond to GPS measurements that are associated with a higher degree of accuracy relative to the GPS measurements represented by the white circles.

Figure 4:
FIG. 4 illustrates only the raw GPS data with a high signal-to-noise ratio (SNR) captured in association with the image scan of the property in accordance with one or more embodiments described herein.

FIG. 4 illustrates another aerial view of the property depicted in FIGS. 2 and 3 with only the raw GPS data having high SNR values displayed, in accordance with one or more embodiments described herein. In this regard, FIG. 4 depicts the filtered/remaining set of GPS measurements with high SNR values (e.g., greater than 25.0 dB) after removal of the GPS measurements having low SNR values. As can be seen by comparison of the filtered, high SNR GPS coordinates shown in FIG. 4 with the original scan path shown in FIG. 2, many of the filtered GPS measurements are still incorrectly located at positions that do not correspond to the actual scan path. Thus, even if the noisy GPS measurements are removed, the accuracy of the resulting GPS measurements may not be sufficient to support correlating each indoor scan locations with a single GPS coordinate location (e.g., latitude and longitude) having a level of accuracy that enables distinguishing between and relating indoor scan locations and outdoor scan locations. In addition, even if the noisy GPS measurements are removed, they still may be a plurality of GPS measurements that could be associated with a single scan location. For example, the number of GPS measurements captured over the course of a scan can exceed the number of capture locations, especially in implementations in which the GPS module is configured to capture several GPS measurements during rotation of the camera at a fixed location and/or between capture locations. However, a primary goal of system 100 is to associate each capture location with a single GPS coordinate location.

With reference back to FIG. 1, in some embodiments, to reduce the number of GPS measurements associated with a single capture location and facilitate matching each capture location with a single GPS coordinate location, the geolocation component 108 can match one or more of the raw GPS coordinates with a single capture location based on the time when the image data was captured at the capture location and the time when the GPS measurements were captured. For example, in implementations in which image data is captured at one or more capture locations by rotating the camera about a fixed axis, the image data can be time stamped with information indicating the start time and end time of the rotation. According to this example, the geolocation component 108 can identify GPS coordinates captured between the start and end time of the rotation and associate these GPS coordinates with the capture location. In other implementations, the geolocation component 108 can be configured to associate raw GPS coordinates with a specific capture location based on captured of the GPS coordinates within a defined time range relative to time of capture of an image at the capture location. In this regard, the geolocation component 108 can group or cluster sets of raw GPS coordinates with single capture locations based on time stamp information associated therewith. In accordance with clustering raw GPS coordinates based on matching their capture times to capture times/periods associated with respective capture location, in some implementations, the geolocation component 108 can also remove any GPS coordinates captured at times that do not correspond to image capture times (e.g., remove GPS coordinates captured between capture positions).

In one embodiment, the geolocation component 108 can cluster or group raw GPS coordinates to single scan locations in this manner before filtering out the "bad" (e.g., low SNR) coordinates from the initial collection of raw GPS coordinates. With this embodiment, after clustering raw GPS coordinates with a single capture location based on time of capture, the filtering component can further remove any "bad" GPS coordinates from the cluster using the filtering criteria discussed herein (e.g., SNR, PDOP, etc.). In other embodiments, the geolocation component 108 can perform the clustering process after filtering out the "bad" GPS coordinates.

Based on filtering out the "bad" raw GPS coordinates and grouping or clustering the remaining "good" (e.g., high SNR) GPS coordinates to respective capture locations based on time of capture, each capture location can be associated with a cluster or group (of one or more) raw, "good" GPS coordinates. In some embodiments, the geolocation component 108 can further evaluate a group or cluster of GPS coordinates associated with a single scan location to generate a single GPS coordinate for that scan location. For example, in some implementations, the geolocation component 108 can determine the centroid of the raw, filtered GPS coordinates clustered with a single scan location. In other implementations, the geolocation component 108 can select the raw GPS coordinates in the cluster having the highest SNR value, the lowest PDOP value, or the "best" score that reflects a combination of the SNR value and the PDOP value associated therewith. For example, the geolocation component 108 can score the respective GPS coordinates associated with a capture location as a function of their SNR values and PDOP values using a scoring function that rewards high SNR values and low PDOP values. The geolocation component 108 can further select the GPS coordinates with the best score. In either of these implementations, the geolocation component 108 can generate or match a single GPS coordinate location (latitude and longitude) with each scan location.

In order to account for any remaining level of inaccuracy associated with the raw filtered GPS coordinates matched to the respective scan locations, the optimization component 106 can be configured to further refine the raw GPS coordinates (e.g., those exhibiting the minimum level of accuracy) to improve the accuracy of the raw GPS coordinates. In various embodiments, the optimization component 106 can be configured to adjust (e.g., adjust the original latitude and/or longitude values) one or more of the raw (filtered) GPS coordinates based on the aligned positions of the image scans relative to the local 3D coordinate system as provided in the position data for scan images 122. The optimization component 106 can further employ the reference orientation information (e.g., included in the orientation data for scan images 124) associated with the scan aligned positions indicating the reference orientations for each image relative to the True North of the global positioning coordinate system to further adjust the raw GPS coordinates to improve the accuracy of the GPS coordinates matched with each scan location. The resulting (adjusted) GPS coordinates are referred to herein as "optimized" GPS coordinates.

In one or more embodiments, the optimization component 106 can achieve this task using an optimization problem with a cost function that accounts for the aligned scan positions, a degree of error (referred to herein as the radius of error) associated with the GPS coordinates, and the reference orientation information. In various implementations, the optimization problem can determine an optimal latitude and longitude value for each (or in some implementations one or more) raw GPS coordinate location associated with (or matched to) a single scan position (e.g., as determined by the geolocation component 108) that facilitates brining the raw GPS coordinate into alignment with the scan position while minimizing error attributed to a known radius of error associated with the raw GPS coordinate location, and/or minimizing error attributed to differences between orientation information associated with the aligned scan position and the raw GPS coordinate location.

The radius of error corresponds to the size of an area around a GPS coordinate location wherein any location within the area could correspond to the actual GPS measurement. In particular, each GPS measurement has a radius of error that is a function of the PDOP value associated therewith. If the radius is too large, the GPS measurement can correspond to several scan positions. In this regard, the wider the radius of error, the greater the uncertainty in the accuracy of the GPS measurement.

Figure 5:
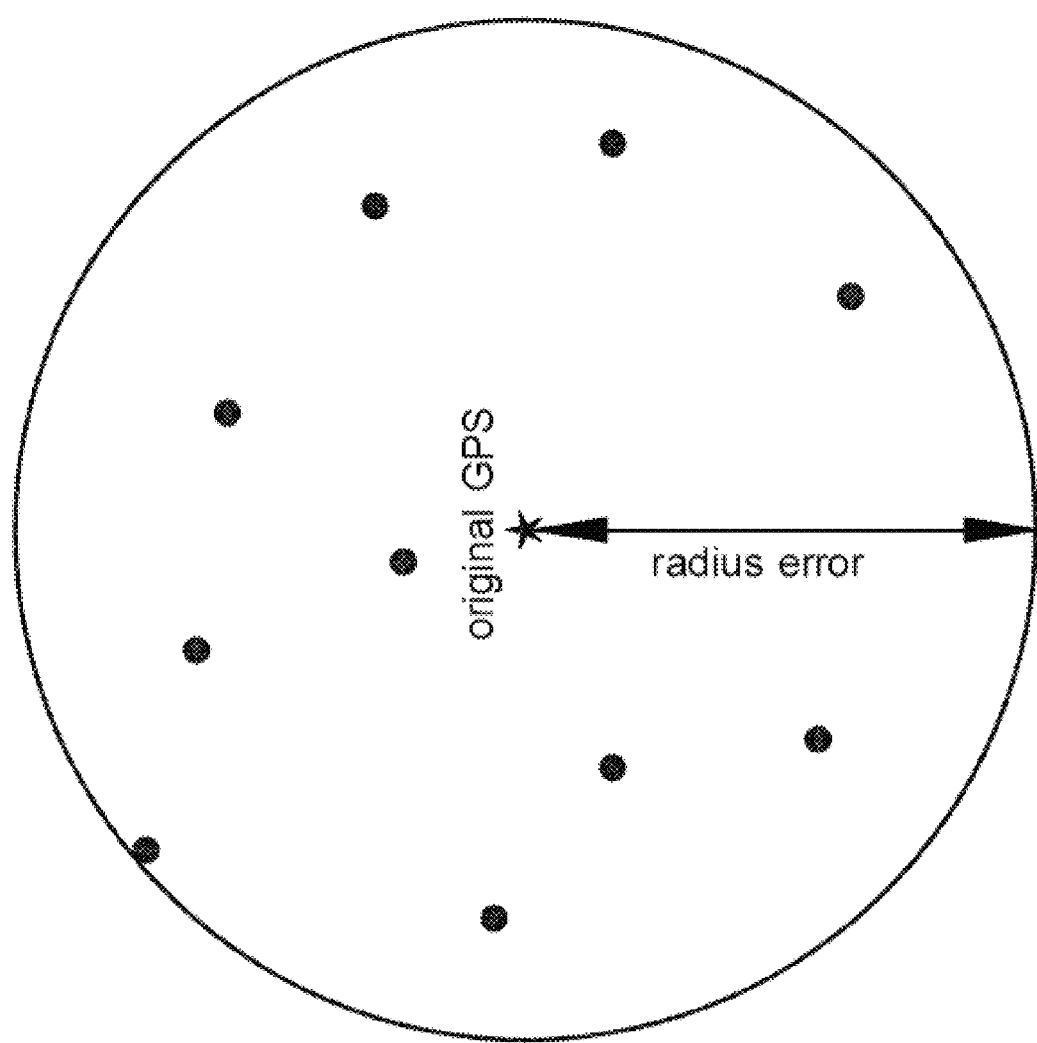
FIG. 5 provides a diagram illustrating the radius of error associated with a GPS signal in accordance with one or more embodiments described herein.

For example, FIG. 5 provides a diagram illustrating the radius of error associated with a GPS signal in accordance with one or more embodiments described herein. The radius of error is illustrated in FIG. 5 by a circular region, wherein the raw GPS measurement is located in the center of the circle and represented by the star symbol, and wherein the area of the circle is defined by the length of the radius of error. In the embodiment shown, the black dots correspond to possible locations of optimized GPS coordinates generated based on optimization of the raw GPS coordinate measurement located at the center of the circle. In this regard, the radius of error defines a circular area within which the raw GPS coordinate measurement could be moved such that any location within the defined circular area could correspond to the actual position where the raw GPS coordinate was captured. In this regard, as the radius of error increases, the number of possibilities of the true capture location of the camera also increases. Thus, the radius of error restricts the area in which the actual capture location of the camera could be in relation to the raw GPS coordinates matched therewith. For example, in the embodiment shown, given the raw GPS measurement at the circle center, the actual GPS coordinate location of the camera could correspond to any of the black dots depicted within the circle. The optimization of the raw GPS coordinate measurement aims to determine whether and how to move or adjust the raw GPS coordinate measurement within the radius of error (e.g., within the circular area), to correspond to the actual capture location of the image. For instance, in accordance with the example diagram shown in FIG. 5, the goal of the optimization problem can correspond to determining whether and how to move the star symbol within circular region defined by the radius of error to position the star symbol at an optimized location that more closely matches the actual GPS capture location of the camera.

In order to account for this scenario, the optimization component 106 can employ an optimization problem that adjusts the raw (filtered) GPS coordinates by aligning each scan position with a single GPS measurement while also minimizing the amount of error with respect to the radius of error associated with each GPS measurement. In this regard the error becomes a constraint and the task of matching each scan location with a single GPS coordinate location can be formulated as an optimization problem with a cost function that penalizes the raw GPS measurements based on the radius of error associated therewith. In other words, the radius of error becomes a constraint of the optimization problem that restricts the degree of adjustment of the raw GPS coordinate associated therewith. In one or more embodiments, the optimization problem can be formulated in accordance with Equation 1 below:

$$f_1(\alpha, t, \{g_i\}_{i=0}^N) = \sum_{i=0}^{N} \left( \frac{1}{r_i^2 - \|g_i - g_i^0\|^2} + \|p_i - R(\alpha)(g_i + t)\|^2 \right) \quad \text{Equation 1}$$

wherein:
- $r_i$ is the radius of error of the $i^{th}$ raw GPS coordinate $g_i^0$,
- $g_i$ is the optimized GPS coordinates of $g_i^0$,
- pi is the $i^{th}$ camera position,
- N is the total number of the aligned image scans,
- $\alpha$ is the angle required to align the optimized GPS coordinates with the aligned scan positions
- $R(\alpha)$ is the rotation defined by the angle $\alpha$ around the z-axis (the normal to the ground), and
- t is the translation that aligns the GPS coordinates with the aligned scan positions.

The optimization problem represented by Equation 1 takes advantage of the fact that each of the capture locations of the scan images has already been aligned relative to one another and a common/local 3D coordinate space. In this regard, in association with application of the optimization problem in accordance with Equation 1, the optimization component 106 can treat the aligned scan positions as fixed. The optimization problem can then be applied by the optimization component 106 to determine how to adjust the raw GPS coordinates to align them with the fixed aligned position within the limit defined by the radius error. This optimization technique works because the depth data associated with the indoor scan images that was used to determine the aligned positions of the scan images is a more accurate measure of distance between scans than the indoor GPS data. Mathematically, by applying Equation 1 to determine the optimized GPS coordinates, the optimization component 106 is using a transform from the local 3D system of the 3D model into the global positioning coordinate system of the GPS coordinates. In this regard, in accordance with Equation 1, $R(\alpha)$ and t define the transform that aligns the global coordinate system (where the GPS coordinates are expressed) and the local coordinate system (where the aligned scans are expressed). The transform thus places the raw GPS coordinates and the aligned scan positions in the same coordinate system so that the optimization component 106 can adjust the raw GPS within the radius of error limit by minimizing the distance between each aligned scan location and the raw GPS coordinate measurement (latitude and longitude), matched thereto. Accordingly, the optimization component 106 can adjust the raw (filtered) GPS coordinates as function of a transformation between the local 3D system and the global positioning coordinate system associated with the raw GPS coordinates. This takes into account the degree of uncertainty of each indoor GPS measurement.

Figure 6:
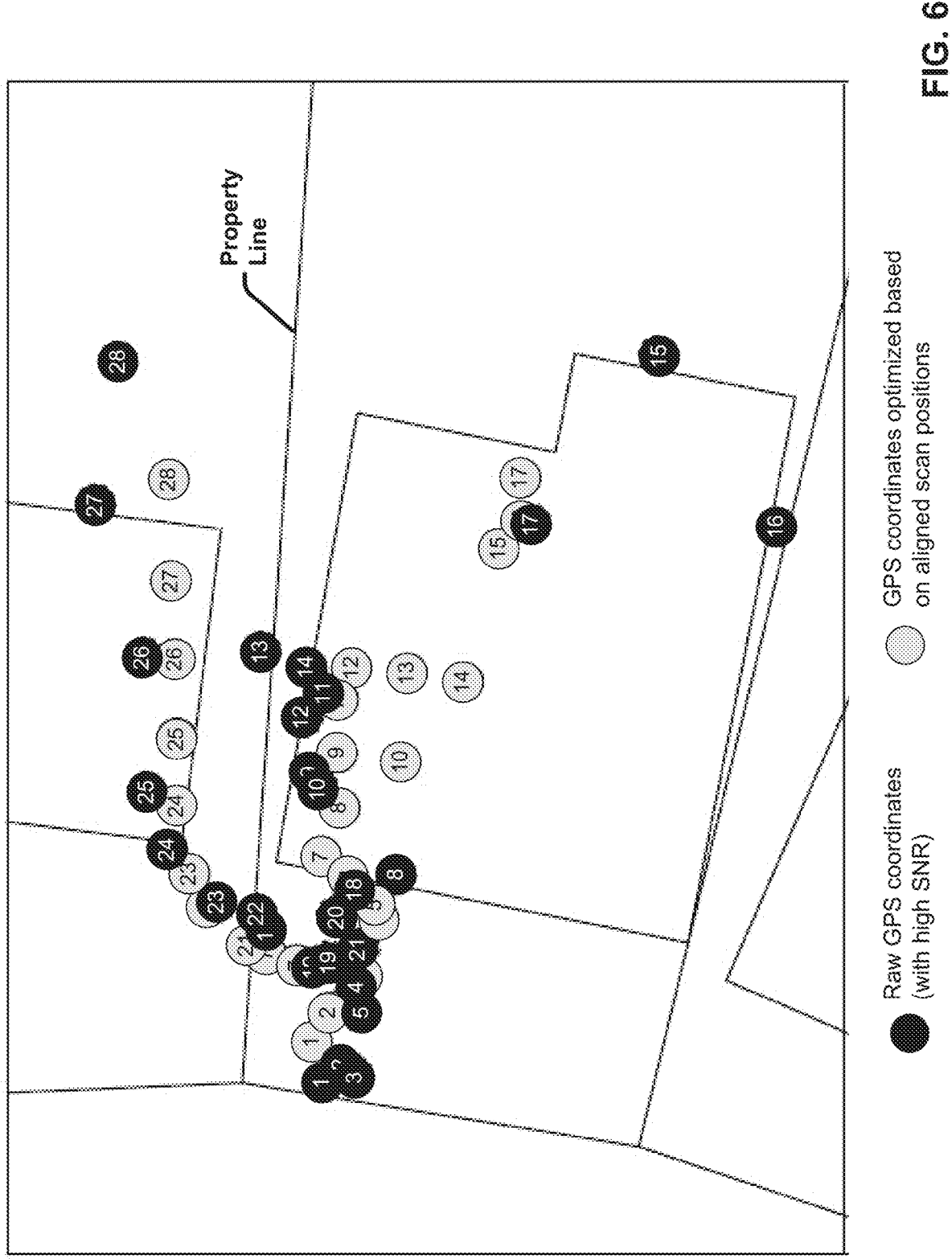
FIG. 6 provides an illustration comparing raw GPS coordinates with optimized GPS coordinates after optimization based on aligned positions of image scans in accordance with one or more embodiments described herein.
Figure 7:
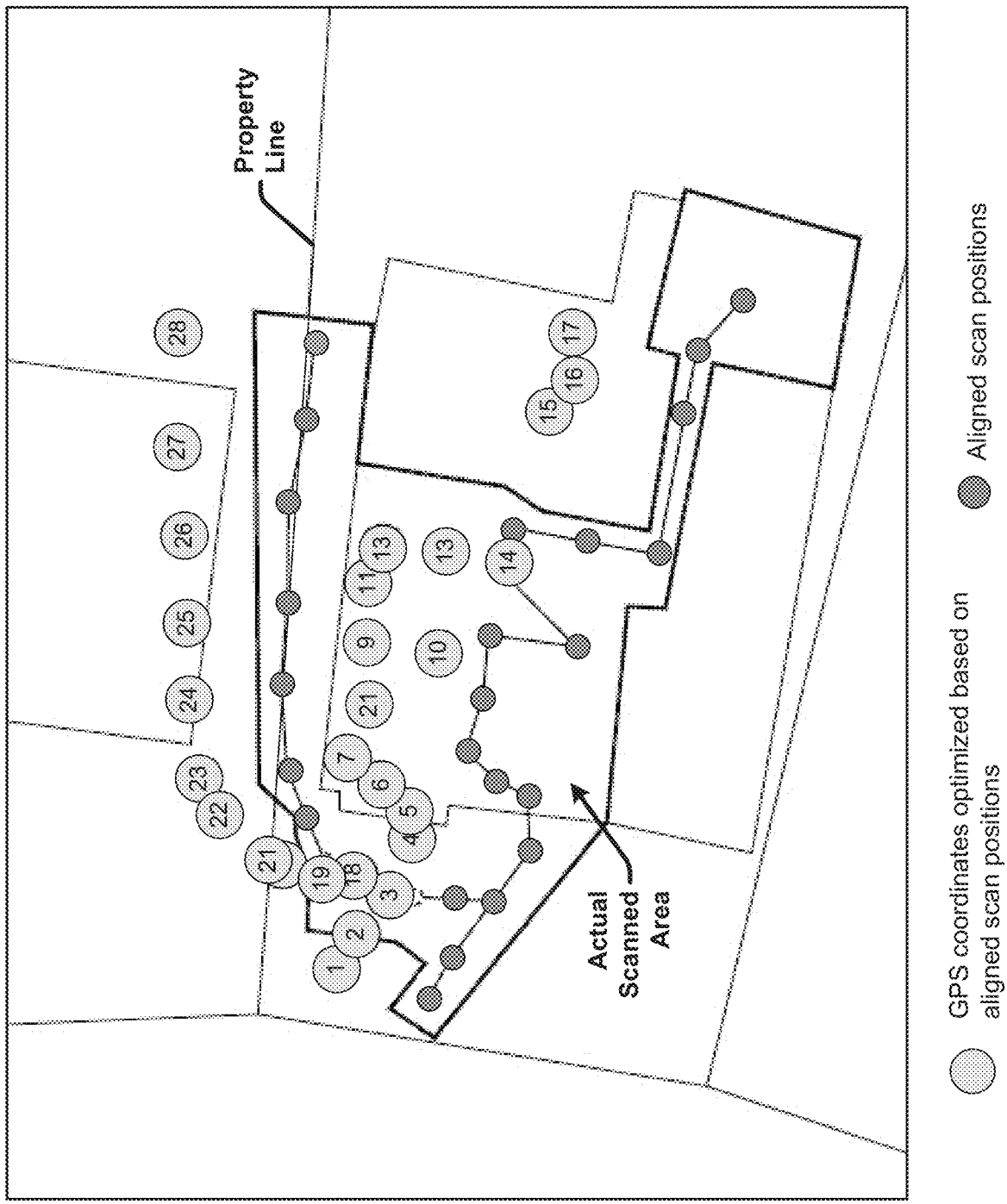
FIG. 7 provides an illustration comparing the aligned positions of image scans with optimized GPS coordinates after optimization based on the aligned positions of the image scans in accordance with one or more embodiments described herein.

FIG. 6 provides an illustration comparing raw GPS coordinates with optimized GPS coordinates after optimization based on aligned positions of image scans using a cost function that refines the raw GPS coordinates based on radiuses of error associated therewith, (e.g., in accordance with Equation 1). FIG. 7 provides an illustration comparing the aligned positions of the image scans with the optimized GPS coordinates after optimization based on the aligned positions of the image scans in accordance with one or more embodiments described herein.

In the embodiment shown in FIG. 6, the black circles correspond to raw GPS coordinates with high SNR values (e.g., greater than 25 dB) as selected/filtered by the filtering component 104 and/or the geolocation component 108. In FIGS. 6 and 7, the light gray circles correspond to the optimized GPS coordinates generated after the optimization of the raw GPS coordinates based on their corresponding radiuses of error and aligned scan positions (e.g., in accordance with Equation 1). The dark gray (smaller) circles shown in FIG. 7 correspond to the aligned scan positions of the scan images (e.g., the aligned capture positions/locations of the scan images). It is noted that in FIG. 7, the number of optimized GPS coordinates matches the number of scan positions. This is because prior to optimization, each scan location can be matched with a single raw GPS location that has been generated from and/or selected from a filtered and/clustered set of raw GPS coordinates associated with each scan location (e.g., by the filtering component 104 and/or the geolocation component 108, as described above).

With reference to FIG. 6, the respective circles are identified by numbers to facilitate demonstrating how the respective raw GPS coordinates are moved based on optimization in accordance with Equation 1. For example, the position of raw GPS coordinate identified by black circle 15 moves significantly after optimization, as can be seen by the relative position of optimized GPS coordinate 15 represented by the light gray circle. With reference to FIG. 7, as can be seen by comparison of the light gray circles with the dark gray circles, the optimized GPS coordinates optimized in accordance with Equation 1 substantially correspond to the original scan path. However, the optimization results presented in FIGS. 6 and 7 present the "best case" scenario.

Figure 8:
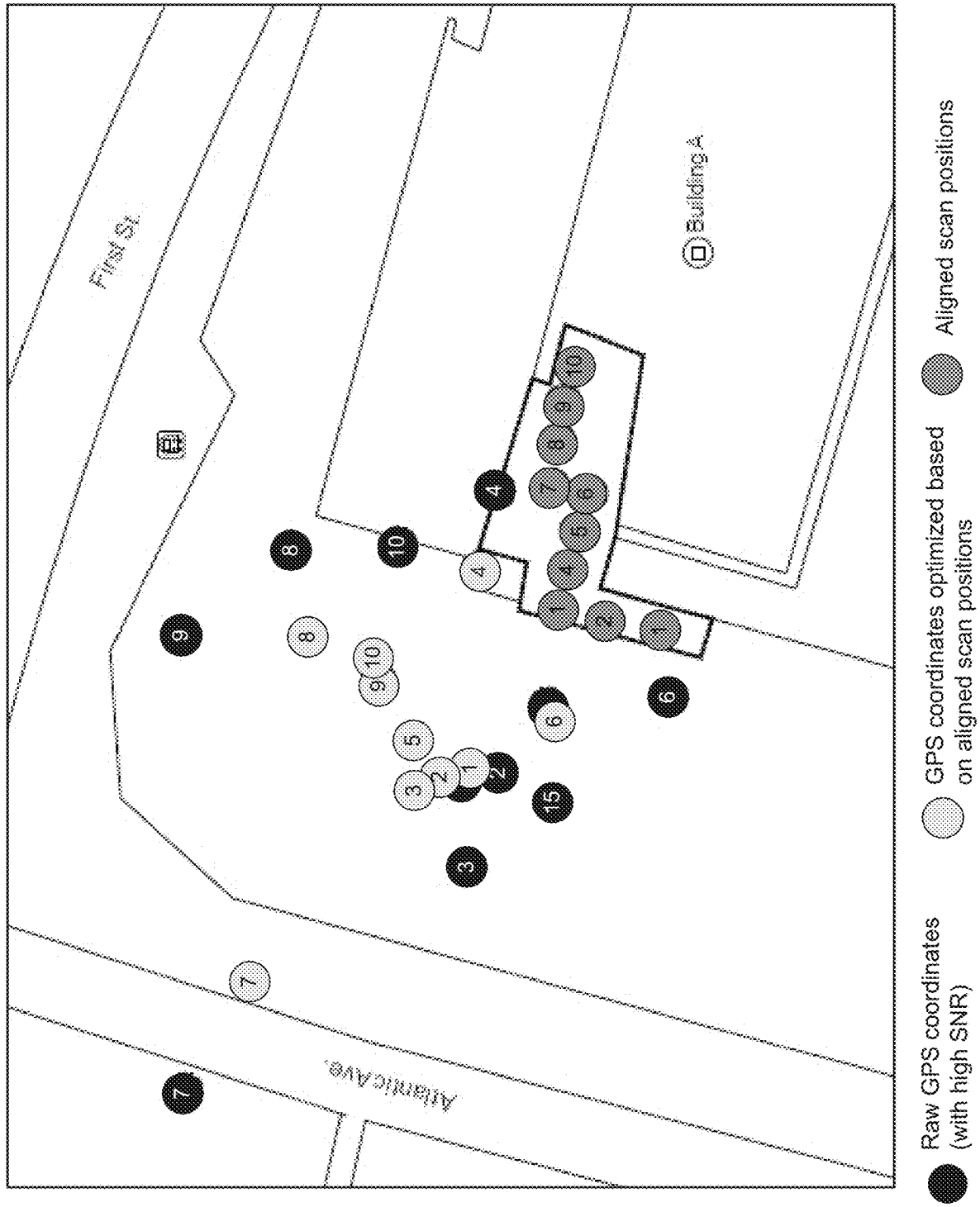
FIG. 8 provides an illustration demonstrating inaccurate GPS coordinates generated after optimization based on aligned positions of image scans in accordance with one or more embodiments described herein.

For example, FIG. 8 provides an illustration demonstrating inaccurate GPS coordinates generated after optimization based on aligned positions of image scans in accordance with one or more embodiments described herein. In particular, FIG. 8 presents another example application of Equation 1 to a set of raw GPS coordinates (e.g., with high SNR values) captured in association with a different scan. In the embodiment shown in FIG. 8, the black circles correspond to raw GPS coordinates with high SNR values (e.g., greater than 25 dB), the light gray circles correspond to the optimized GPS coordinates generated after the optimization of the raw GPS coordinates based on the their corresponding radiuses of error and aligned scan positions (e.g., in accordance with Equation 1), and the dark gray circles correspond to the aligned scan positions (e.g., the aligned capture positions/locations of the scan images). In accordance with this example implementation, aligned scan positions 1, 2 and 3 are located outside of Building A while the remaining aligned scan positions are located inside Building A. As can be seen by comparison of the light gray circles with the dark gray circles, the optimized GPS coordinates in this case do not correspond to the original scan path. For example, none, of the optimized GPS coordinates are even located inside of Building A.

The inaccurate results demonstrated in FIG. 8 can be attributed to various factors. For example, even after optimization in accordance with Equation 1, inaccurate results may be observed in implementations in which the raw GPS coordinates are associated with high PDOP values, even after filtering the noisy measurements. This is because GPS readings indoors are often inaccurate. The inaccurate results can also be attributed to the coarse estimation of the radius error associated with the PDOP values for each raw GPS measurement. In this regard, a wrong radius of error applied to even one GPS measurement can disturb the optimization.

With reference again to FIG. 1, in order to further optimize the raw GPS coordinates, the optimization component 106 can update the cost function of the optimization problem to further constrain the alignment of the raw GPS coordinates with the aligned scan positions based on the reference orientations associated with the aligned scan positions (e.g., as provided in by the orientation data for scan images 124). In particular, the reference orientation information provided by the orientation data for scan images is relative to the True North used in the global coordinate system. Thus, the reference orientation information 124 can align the local-3D coordinate system (or the 3D model itself) relative to the cartesian coordinates. For example, based on the direction of reference vectors pointing north from the respective aligned scan positions, one can understand which direction is north relative to the entire set of aligned scan positions. In this regard, the reference orientations add a sense of where the aligned scan positions are with respect to north, south east and west. Accordingly, because the raw GPS coordinates provide a position measurement in relation to the cardinal directions, the orientation information associated with each scan image capture position/location can be used to determine the relative direction of each scan image capture position/location within the global positioning system.

In various embodiments, the reference orientation information associated with each image scan location/positions can comprise a vector that points to due north (e.g., relative to the True North), referred to herein as the reference vector. In one or more implementations, the reference vector for each scan position can be estimated using a calibration process described in greater detail below. The optimization component 106 can employ this reference orientation information to further adjust/optimize the raw GPS coordinates by comparing the reference vector (the estimated north for the 3D model) to the actual north (the True North) of the GPS coordinates, determining the magnitude of the difference, and adding a cost function that penalizes the GPS coordinates based on the magnitude of the difference. In other words, by comparing True North vectors corresponding to the True North direction for the GPS coordinates to the reference vectors corresponding to the estimated north associated with the scan positions and then taking the magnitude of the difference, the optimization component 106 can add that as another error to the cost function to optimize against. In this regard, the cost function can further penalize the respective GPS coordinates based on differences between the reference orientations and actual orientations of the respective GPS coordinates relative to the global positioning coordinates system. With this additional constraint, the optimization problem of Equation 1 becomes an updated optimization problem in accordance with Equation 2 below.

$$f_2(\alpha, t, \{g_i\}_{i=0}^N) = \sum_{i=0}^{N}\left(\frac{1}{r_i^2 - \|g_i - g_i^0\|^2} + \|p_i - R(\alpha)(g_i + t)\|^2\right) + w \times \sum_{i=0}^{M}\|n^T \cdot (R(\alpha)R_{i \to 0} n_i^t) - 1\|^2 \quad \text{Equation 2}$$

wherein:
$r_i$ is the radius of error of the $i^{th}$ raw GPS coordinate $g_i^0$,
$g_i$ is the optimized GPS coordinates of $g_i^0$,
pi is the $i^{th}$ camera position,
N is the total number of the aligned image scans,
$\alpha$ is the angle required to align the optimized GPS coordinates with the aligned scan positions
$R(\alpha)$ is the rotation defined by the angle $\alpha$ around the z-axis (the normal to the ground),
t is the translation that aligns the GPS coordinates with the aligned scan positions,
$n_i^t$ is the reference vector pointing to the north in the $i^{th}$ scan coordinate system (e.g., estimated from calibrated magnetometer readings),
$n^T$ is the True North expressed in the ENU global coordinate system, which in this case is:

$$n^T = \begin{pmatrix} 0 \\ 1 \\ 0 \end{pmatrix},$$

$\omega$ is a weight to balance the three terms of the cost function, and
$R_{i \to 0}$ is the rotation from the scan position to the first scan position.

With reference again to system 100, in one or more embodiments, the computing device 102 can include orientation calibration component 112 to facilitate estimating the reference vectors for the aligned scan positions. In various implementations, the orientation calibration component 112 can calibrate the magnetometer measurements determined for respective scan positions to ensure the magnetometer measurements are accurate. A magnetometer measures the strength of a magnetic field relative to the magnetometer's coordinate system. In embodiments in which the camera used to capture the scan images includes a magnetometer, as the camera rotates 360° degrees, the magnetometer can be configured to determine magnetometer measurements over the entire course of rotation. Assuming the magnetometer points in the same direction as the camera lens, the resulting data generated includes a list of degrees of rotation and the magnetic field strength at each degree of rotation.

Figure 9:
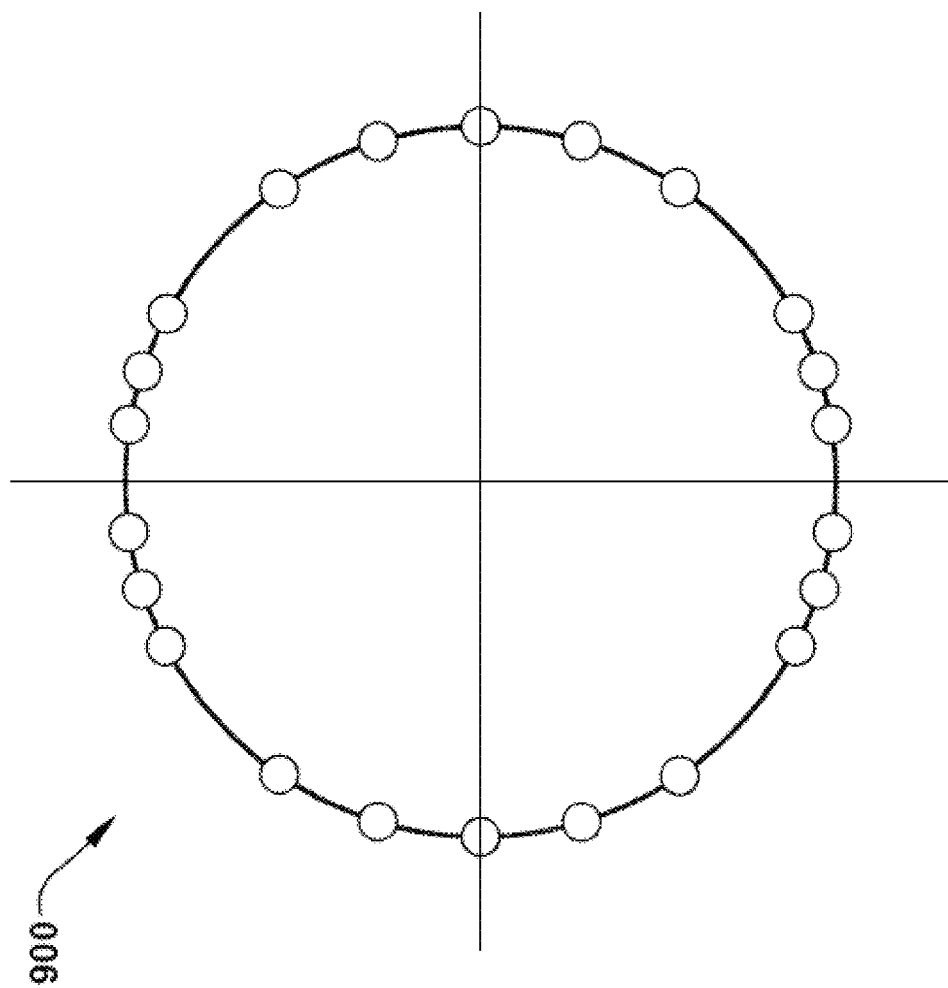
FIG. 9 provides a diagram illustrating ideal magnetometer measurements generated in association with rotation of a camera 360° around a fixed axis in accordance with one or more embodiments described herein.

FIG. 9 provides a diagram illustrating ideal magnetometer measurements generated in association with rotation of a camera 360° around a fixed axis in accordance with one or more embodiments described herein. In accordance with the example implementation described above wherein data indicating degrees of rotation and the corresponding magnetic strength at each degree of rotation was generated for each scan position, the plotted values would generate a perfect circle 900 centered on the scan position as the origin of rotation. For example, in the diagram shown in FIG. 9, the small circles located around the circumference of the circle correspond to magnetometer measurement. For example, assuming the magnetometer and the camera are calibrated to the exact same coordinate system, the position of each circle would correspond to the orientation of the camera at the time each magnetometer measurement was determined.

The data reflecting the perfect circle as shown in FIG. 9 reflects an ideal scenario without any errors. However, in reality, perfect measurements are not always observed. For example, three types of error can throw off the magnetometer, including errors attributed to tilt, hard iron effect, and soft iron effect. In one or more embodiments, the orientation calibration component 112 can calibrate the raw magnetometer data to account for tilt, hard iron effect and soft iron effect prior to utilizing the magnetometer data to determine the reference orientation vectors.

Tilt refers to the relative orientation of the magnetometer to the ground. For ideal measurements, the magnetometer should be parallel to the ground. In order to correct errors attributed to tilt of the magnetometer away from a parallel ground orientation, the orientation calibration component 112 can align the rotation axis of the magnetometer with the gravity vector determined by an inertial measurement unit (IMU) coupled to the camera. The orientation calibration component 112 can then calibrate the magnetometer measurements based on this alignment. Hard iron effect refers to distortion due to the presence of permanent magnets nearby. In one or more embodiments, the orientation calibration component can calibrate the magnetometer measurements to remove errors attributed to hard iron effect by computing the centroid of the data and then re-centering the data. Soft iron effect refers to materials with high magnetic permeability nearby. While they do not have a magnetic field themselves, they attenuate the earth's field that the magnetometer measures. With reference to FIG. 9, if soft iron effect errors were present, the perfect circle would alternatively have an ellipse shape. In one or more embodiments, the orientation calibration component 112 can rescale the magnetometer measurements to transform the ellipse into a circle.

In various embodiments, once the magnetometer data is calibrated, the orientation calibration component 112 can use it to estimate the compass heading, the magnetic north, for each scan position. The compass heading measures the clockwise angle from north. The compass heading can be computed as follows, compass heading (c)=tan−1 (my/mx), wherein "my" and "mx" are the two magnetometer readings in the plane parallel to the ground. Once the compass heading is computed from the calibrated magnetometer data, the orientation calibration component 112 can then calculate the vector that points to the True North for each scan.

Figure 10:
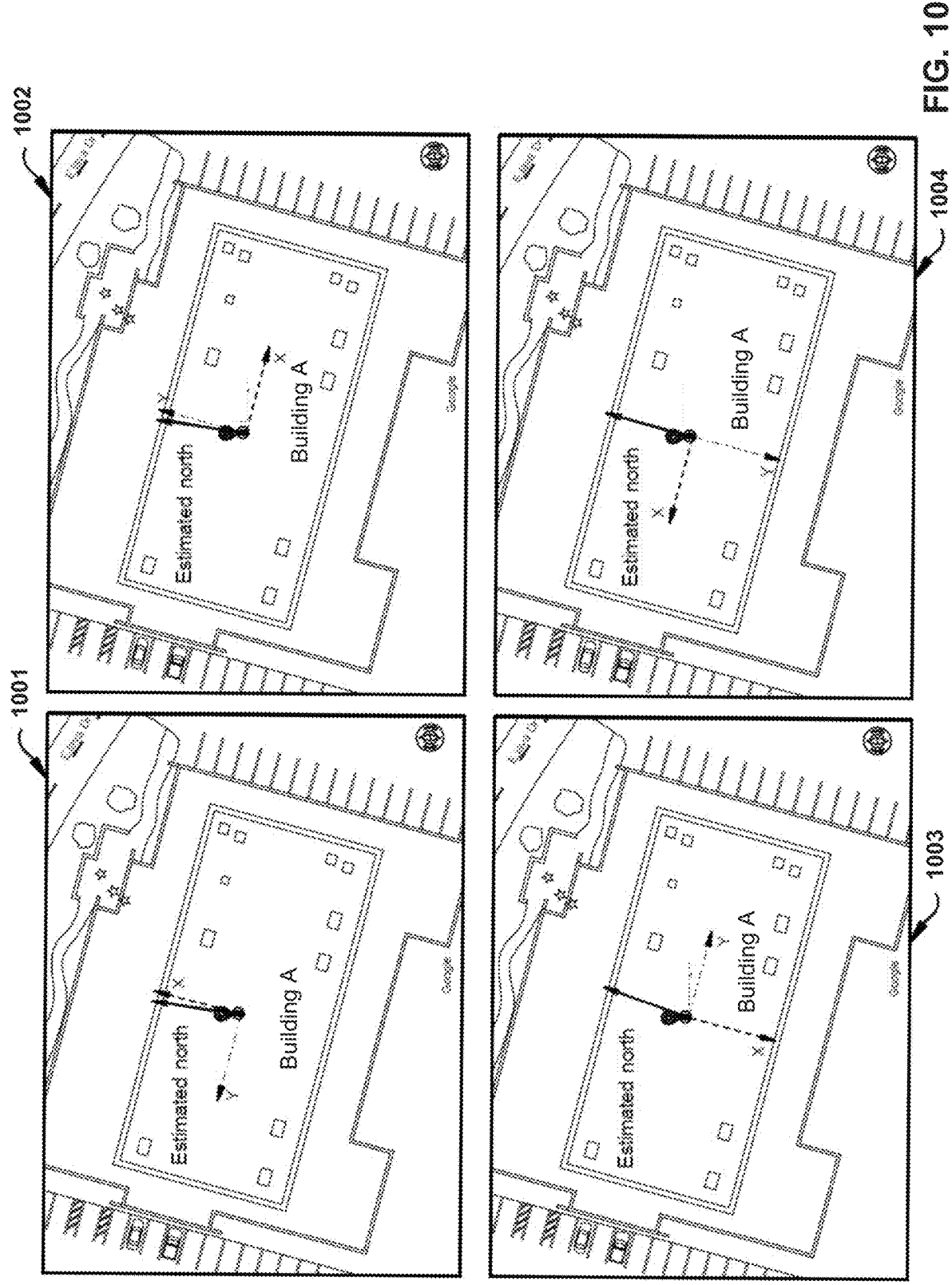
FIG. 10 presents experimental data illustrating orientation vectors corresponding to a reference orientation calculated based on magnetometer measurements in accordance with one or more embodiments described herein.

FIG. 10 presents experimental data illustrating orientation vectors corresponding to a reference orientation calculated based on magnetometer measurements in accordance with one or more embodiments described herein. FIG. 10 presents four images (image 1001, image 1002, image 1003 and image 1004) with reference vectors corresponding to the estimated north determined based on calibrated magnetometer data in accordance with the techniques described herein. The images shown in FIG. 10 depict actual results that were determined using the calibration techniques described herein based on raw magnetometer data captured by a magnetometer coupled to the camera and pointing in a same direction as the camera lens. To generate this experimental data, the camera was positioned at a fixed location relative to a building (e.g., Building A), and the estimated north was determined based on the magnetometer data captured in association with rotation of the camera 90° three times in a clockwise direction (e.g., the camera was rotated from 0°, to 90°, 180°, and 270° degrees and magnetometer measurements were captured at each of the four rotation orientations). In the embodiment shown, the estimated north is represented by the solid line arrow and is based on the direction the camera is facing. In image 1001, the camera is facing west, in image 1002 the camera is facing north, in image 1003 the camera is facing east, and in image 1004 the camera is facing south. As can be seen based on the images in FIG. 10, no matter which way the camera faces, the solid line arrow (e.g., the reference vector) consistently points in the same direction. Furthermore, the solid line arrow also points in the correct direction, north. In accordance with these techniques, a reference compass heading of north for each scan position can be determined by the orientation calibration component 112 and associated with each scan position (e.g., as orientation data for scan images).

Figure 11:
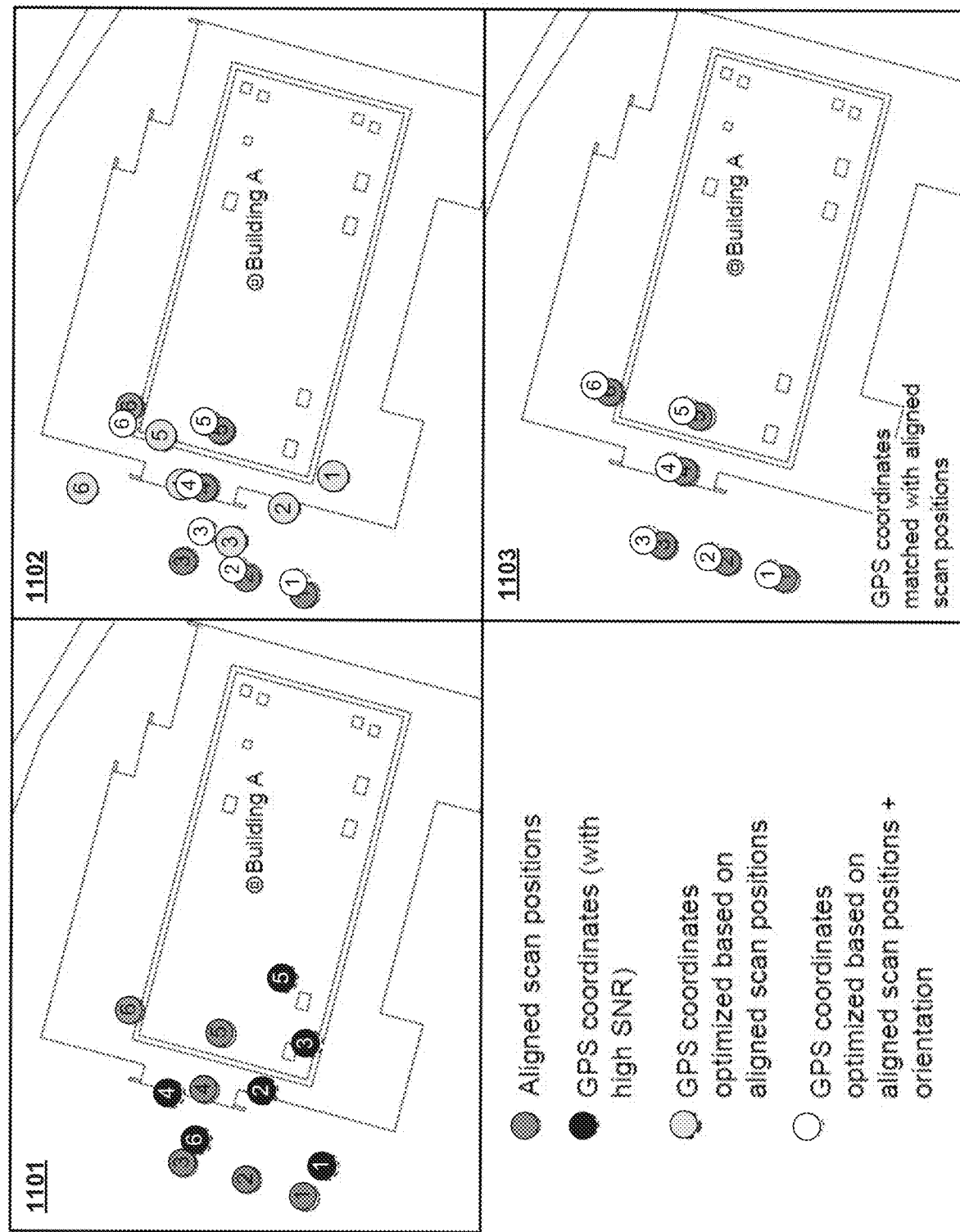
FIG. 11 provides an illustration comparing aligned scan positions with GPS coordinates generated after optimization based on the aligned scan positions and reference orientations for the aligned scan positions in accordance with one or more embodiments described herein.

FIG. 11 provides an illustration comparing aligned scan positions with GPS coordinates generated after optimization based on the aligned scan positions and reference orientations for the aligned scan positions in accordance with one or more embodiments described herein. In the embodiment shown, the dark gray circles correspond to the aligned scan positions (e.g., the aligned capture positions/locations of the scan images) in accordance with the actual scan path followed. The black circles correspond to raw GPS coordinates with high SNR values (e.g., greater than 25 dB). In accordance with the illustration provided in FIG. 11, these raw GPS coordinates were generated for demonstration purposes by starting with GPS coordinates that match the scan locations and then introducing artificial errors. In this regard, the raw GPS coordinates shown in FIG. 11 are simulated GPS measurement with errors that are likely to be observed in actual implementation. In this regard, image 1101 compares the relative positions of the aligned scan positions (the dark gray circles) with the raw GPS coordinates (the black circles) that have been filtered and matched to the respective aligned scan positions prior to optimization.

In image 1102, the light gray circles correspond to the optimized GPS coordinates generated after optimization only based on the aligned scan positions in association with minimizing the radiuses of error respectively associated with the raw GPS coordinates (e.g., in accordance with Equation 1). The white circles correspond to the optimized GPS coordinates generated after optimization using Equation 2. In this regard, the white circles depict optimized GPS coordinates determined by the optimization component 106 using an optimization problem that aims to bring the raw GPS coordinates (the black circles) closer to the aligned scan positions (the dark gray circles) that includes a cost function with an orientation constraint and a radius of error constraint. As can be seen in image 1102, the white circles are much better aligned to the scan image capture locations relative to the light gray.

Image 1103 presents the positions of the final optimized GPS coordinates (optimized in accordance with Equation 2) relative to the aligned scan positions with the light gray circles removed. The difference between image 1102 and image 1103 is that image 1102 depicts the exact output of the optimized GPS coordinates generated based on Equation 1 and Equation 2, respectively. Image 1103 presents the result of applying $R(\alpha)$ and t (estimated during the optimization) to the aligned scan. As can be seen by comparing image 1102 and image 1103, the position of the optimized GPS coordinates represented by number 3 in image 1102 is slightly offset from its corresponding aligned scan position after optimization based on Equation 2. This could be attributed to the radius of error associated with the corresponding raw GPS coordinates, which is not always accurate. However, after applying R(α) and t to the aligned scan, the optimized GPS coordinates can be further adjusted to match its corresponding aligned scan position. In practice, applying the transform R(α) and t to the aligned scan can provide even more accurate results than the actual optimized GPS coordinates generated based on Equation 2. Therefore, in some embodiments, the geolocation component 108 can be configured to apply the transform R(α) and t to the aligned scan in conjunction with the optimized GPS coordinates (optimized based on Equation 2) to generate a final match between the optimized GPS coordinate positions and the aligned scan positions.

With reference again to FIG. 1 in view of FIG. 11, once the optimization component 106 has transformed the raw GPS coordinates into optimized GPS coordinates (e.g., the white circles) using the optimization techniques described herein, the geolocation component 108 can assign each or the optimized GPS coordinates to their corresponding aligned scan position to generate the optimized GPS data 118. Information defining the optimized GPS coordinates assigned to the respective scan positions can be stored in a suitable network accessible database (the optimized GPS data 118) to facilitate various additional applications (e.g., generating an exterior image of a structure as described in section II).

Figure 12:
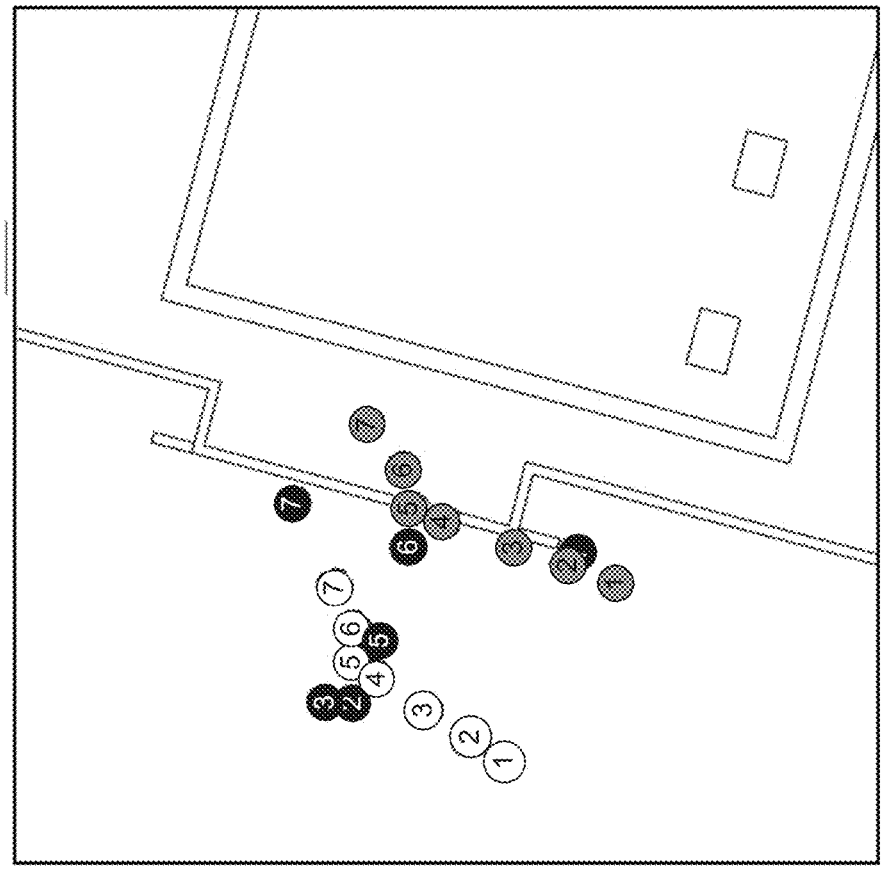
FIG. 12 provides another illustration comparing aligned scan positions with GPS coordinates generated after optimization based on the aligned scan positions and reference orientations for the aligned scan positions in accordance with one or more embodiments described herein.
Figure 12:
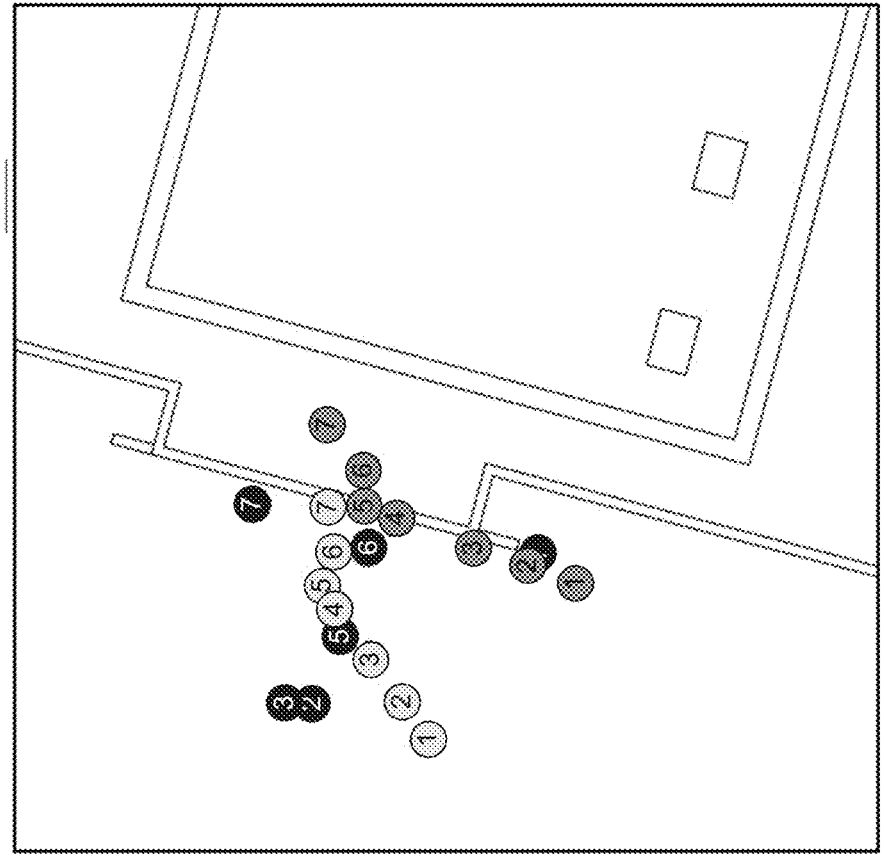

FIG. 12 provides another illustration comparing aligned scan positions with GPS coordinates generated after optimization based on the aligned scan positions and reference orientations for the aligned scan positions in accordance with one or more embodiments described herein. In the embodiment shown in FIG. 12, actual raw GPS measurements were used as opposed to simulated GPS measurements with artificial errors. The aligned scan positions are again shown with the dark gray circles while the raw (filtered) GPS measurements are depicted with the black circles. The left illustration 1201 presents optimized GPS coordinates (the light gray circles) determined in accordance with Equation 1 (e.g., without the orientation constraint), and the illustration on the right (illustration 1202) depicts optimized GPS coordinates (the white circles) determined in accordance with Equation 2 (e.g., with the orientation constraint). As can be seen by comparison of the light gray circles in illustration 1201 with the white circles in illustration 1202, both optimization problems (Equation 1 and Equation 2) generate optimized GPS coordinates that are have a same shape and distribution as the aligned scan positions, however the GPS coordinates generated with the orientation constraint (e.g., with Equation 2) more closely match the aligned scan positions relative to the GPS coordinates generated without the orientation constraint (e.g., with Equation 1)

Figure 13:
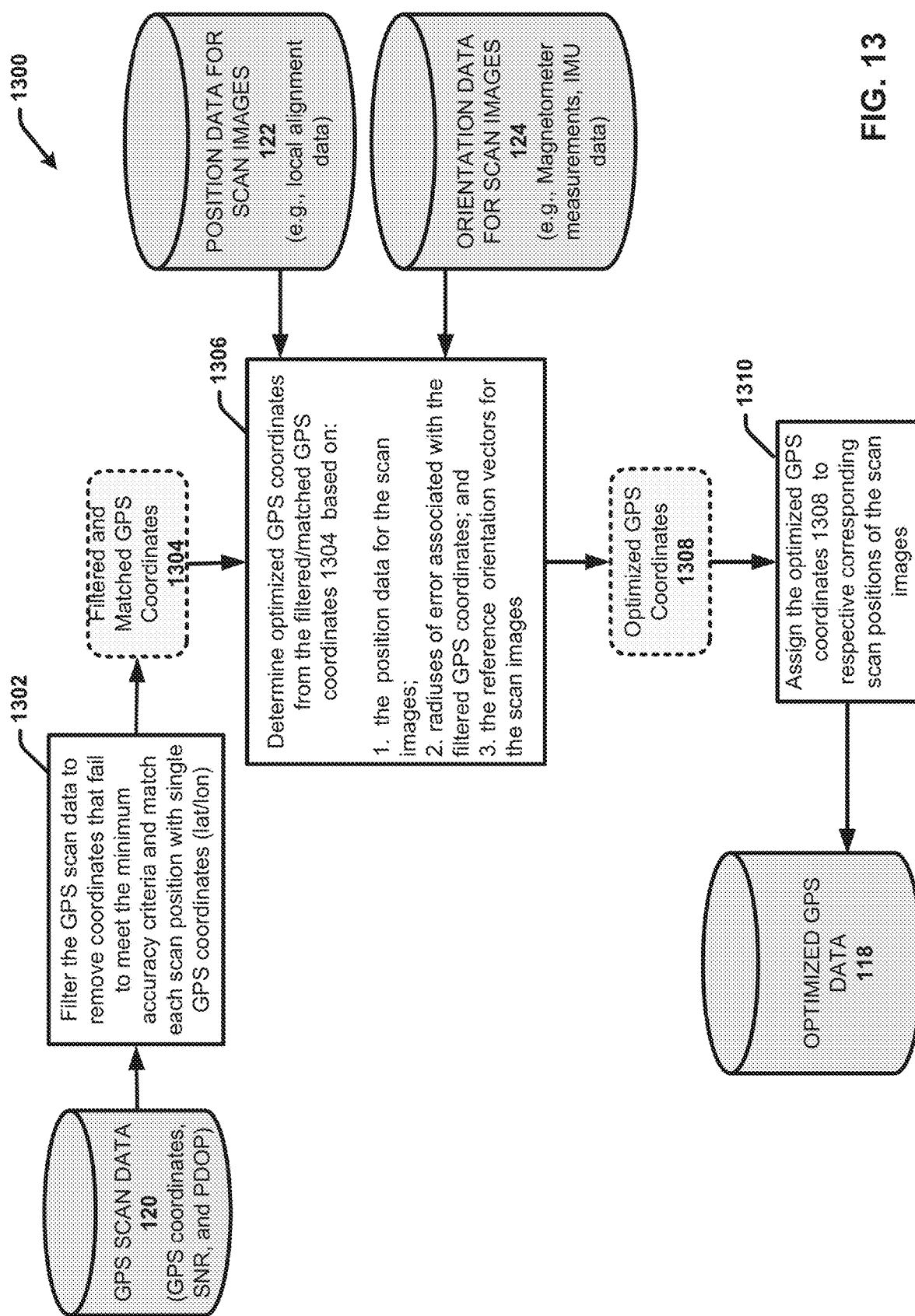
FIG. 13 illustrates a high-level flow diagram of an example method for improving the accuracy of GPS coordinates of indoor photos in accordance with one or more embodiments described herein.

FIG. 13 illustrates a high-level flow diagram of an example method 1300 for improving the accuracy of GPS coordinates of indoor photos in accordance with one or more embodiments described herein. Repetitive description of like elements employed in respective embodiments is omitted for sake of brevity.

In accordance with method 1300, at 1302 the GPS scan data 120 can initially be filtered (e.g., by the filtering component 104) to remove coordinates that fail to meet the minimum accuracy criteria (e.g., a minimum SNR value, a maximum PDOP value, and/or another defined criterion), and each scan location can be matched to single GPS coordinates (e.g., the GPS coordinate that corresponds to the centroid of a cluster of raw GPS coordinates with high SNR associated with each scan location). The resulting coordinates are identified in method 1300 as filtered and matched GPS coordinates 1304. At 1306, an optimization process can be performed (e.g., by the optimization component 106) to determine optimized GPS coordinates from the filtered/matched GPS coordinates 1304 based on: 1. the position data for the scan images (provided in position data for scan images 122); 2. radiuses of error associated with the filtered GPS coordinates (e.g., provided with the GPS scan data 120 and/or determined based on the PDOP values); and 3. the reference orientation vectors for the scan images (e.g., provided with the orientation data for the scan images 124 and/or determined by the orientation calibration component 112). The resulting optimized GPS coordinates are identifying in method 1300 as optimized GPS coordinates 1308. At 1310, the optimized GPS coordinates 1308 can then be assigned to respective corresponding scan positions (e.g., the capture locations/aligned scan positions) of the scan images and stored in an information database as optimized GPS data 118.

Figure 14:
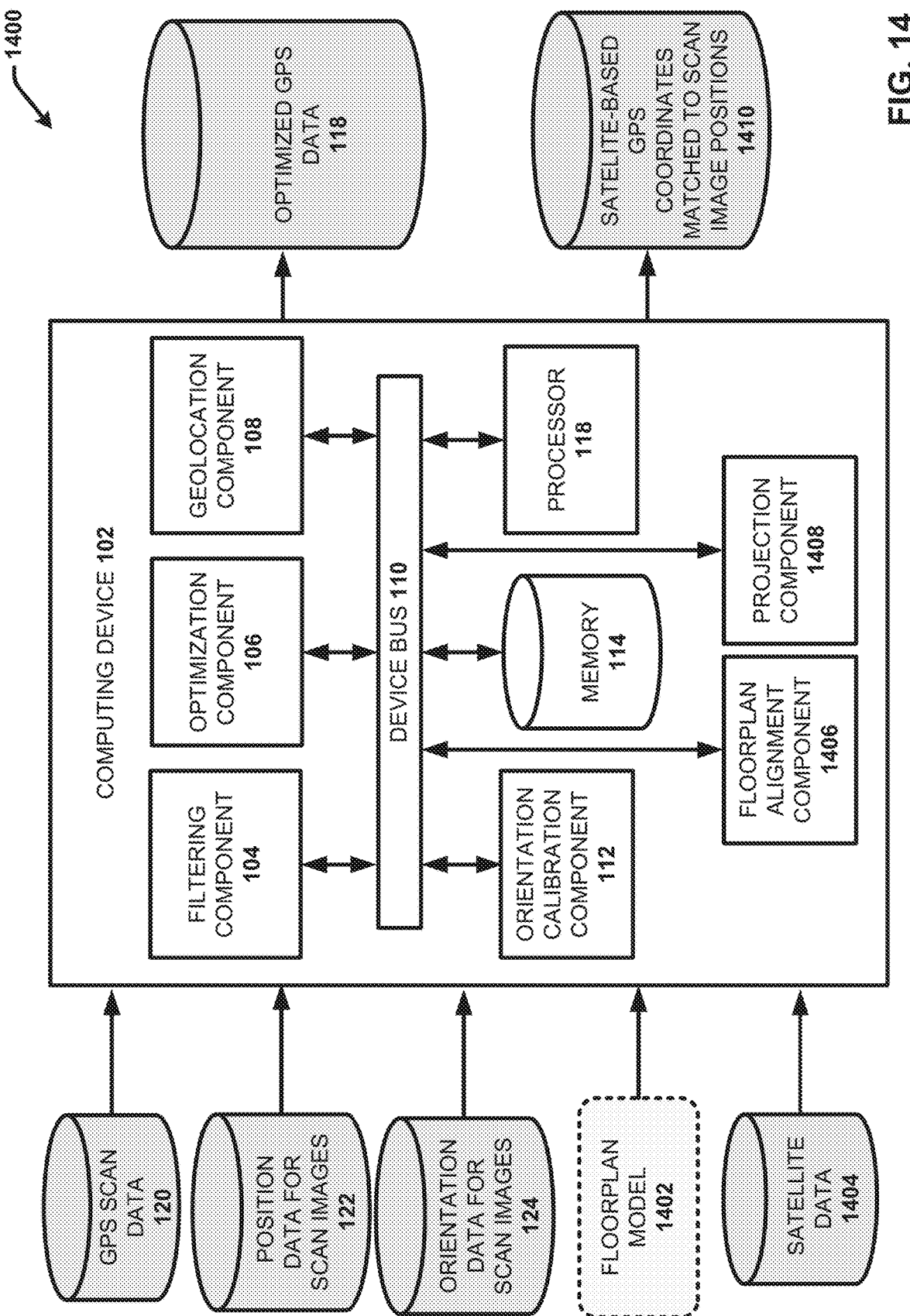
FIG. 14 illustrates a high-level block diagram of an example system for determining GPS coordinates for indoor photos captured without GPS data in accordance with various aspects and implementations described herein.

FIG. 14 illustrates a high-level block diagram of an example system 1400 for determining GPS coordinates for indoor photos captured without GPS data in accordance with various aspects and implementations described herein. System 1400 includes same or similar components as system 100 with the addition of a floorplan model 1402, satellite data 1404, floorplan alignment component 1406, projection component 1408 and satellite-based GPS coordinates matched to scan image positions 1410. Repetitive description of like elements employed in respective embodiments is omitted for sake of brevity.

The GPS optimization and geolocation techniques described above work for spaces scanned with a camera with that includes and/or is coupled to a GPS module and a magnetometer. However, many existing 3D models have been generated based on aligned images captured without GPS data and/or magnetometer measurements. System 1400 provides mechanisms to generate GPS coordinates for scan images captured without GPS and/or magnetometer data. These mechanisms involve accessing satellite imagery included in the satellite data 1404 comprising aerial images of properties and aligning a floorplan model 1402 of a target property with the aerial images to identify a match between the floorplan model and a "best fit" aerial image. Scan image locations can then be projected onto the satellite image from the aligned floorplan model and used to determine a GPS latitude and longitude for each scan image location. In some embodiments, these mechanisms can also be applied to scan images captured with GPS and/or magnetometer data in addition to the GPS optimization and geolocation techniques described above to further confirm and/or optimize the accuracy of the optimized GPS coordinates 118.

In this regard, the floorplan model 1402 can be a schematic floorplan of a property, a schematic floorplan of an architectural structure (e.g., a building, a house, etc.), a schematic floorplan of an interior space of an architectural structure (e.g., a house), and the like. In one or more implementations, the floorplan model 1402 can be or correspond to an aerial view of a 3D model generated based on aligned image data and associated 3D data captured of a space (e.g., during a scan). For example, a floorplan model 1402 can be a simplified representation of surfaces (e.g., walls, floors, ceilings, etc.), portals (e.g., door openings) and/or window openings associated with an interior environment (e.g., captured 3D data for a 3D model). A floorplan model 1402 can contain locations of boundary edges for each given surface, portal (e.g., walls, floors, ceilings, doors, door openings), and/or window opening. A floorplan model 1402 can also include one or more dimensions associated with surfaces (e.g., walls, floors, ceilings, etc.), portals (e.g., door openings) and/or window openings. In an aspect, dimensions under a certain size can be omitted from a floorplan. In some implementations, the floorplan model 1402 can be a 3D floorplan. For example, a 3D floorplan model can comprise edges of each floor, wall, and ceiling as lines. Lines for floors, walls and ceilings can be dimensioned with an associated size. For example, measurements of area (e.g., square footage, etc.) of surfaces and/or other types of measurement data can be associated with the floorplan model 1402 to facilitate scaling a corresponding satellite image aerial view of a structure to the floorplan model, and vice versa, in association with aligning the floorplan model 1402 to the satellite image of the structure.

Figure 15A:
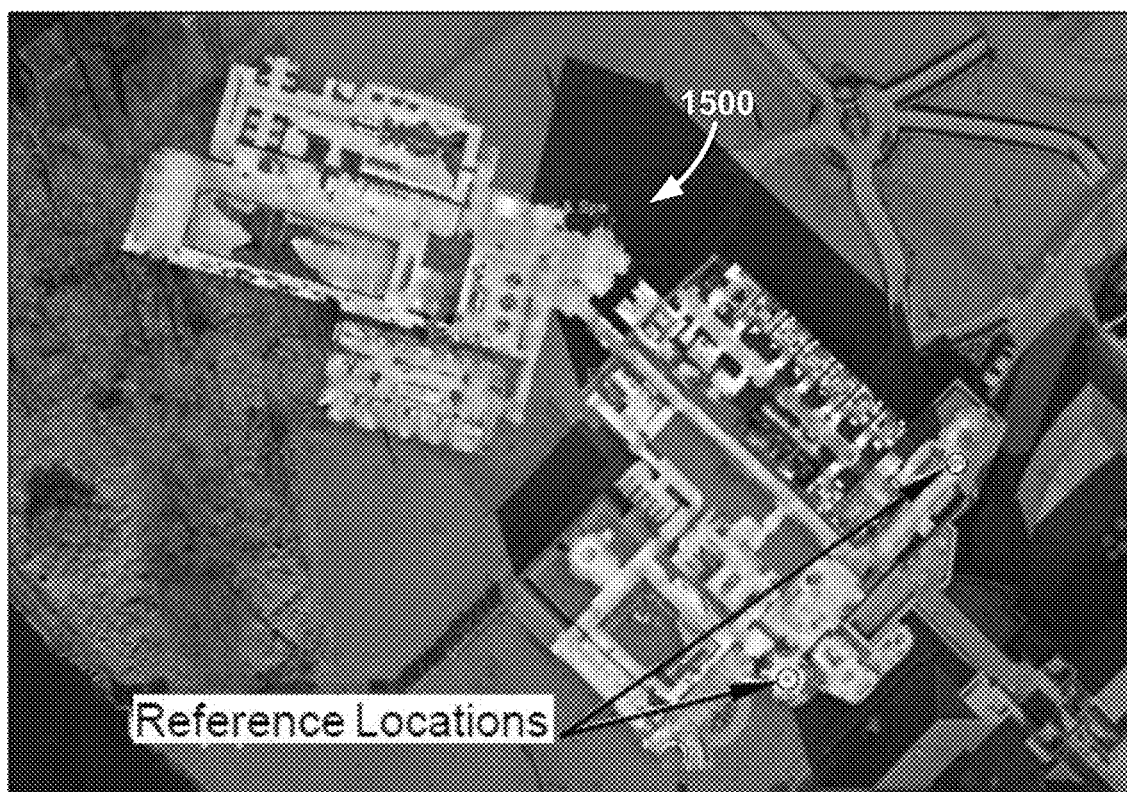
FIG. 15A presents an example floorplan model in accordance with various aspects and embodiments described herein.

FIG. 15A presents an example floorplan model 1500 in accordance with various aspects and embodiments described herein.

With reference again to FIG. 14, the satellite data 1404 can comprise aerial view satellite images of the structures for which 3D models have been generated in accordance with the techniques described herein. The satellite images can also include or be associated with GPS coordinate location information that identifies one or more GPS coordinates corresponding to the structures. For example, in some implementations, the satellite data 1404 can associate a single GPS coordinate with each structure included in a satellite image. In other implementations, the satellite data 1404 can include information that associates a plurality of GPS coordinates with precise locations relative to the structure presented in a satellite image and/or that can be used to determine precise locations of a plurality of GPS coordinates relative to the structure. For example, the satellite data 1404 can include information that aligns the imaged structure with the GPS coordinate system such that latitude and longitude values can be determined for precise locations inside and outside of the structure presented in a satellite image.

The floorplan alignment component 1406 can facilitate matching and aligning a floorplan model 1402 of a structure with a corresponding satellite image providing an aerial view of the structure included in the satellite data. In some implementations, the floorplan alignment component 1406 can receive a physical address for the structure and employ this address to identify a subset of satellite images corresponding to the physical address. Using this subset of images, the floorplan alignment component 1406 can employ various techniques to match correspondences between the floorplan model and a representation of the structure presented in the satellite images to select an image that provides the "best match." For example, in some implementations, the floorplan alignment component 1406 can employ automated image analysis techniques to defined boundary outlines of the structures presented in the satellite images and match the boundary outlines to the floorplan model 1402. The floorplan alignment component 1406 can also employ various machine learning techniques to automatically match and align a floorplan model 1402 to satellite image of the structure represented in the floorplan model. In some implementations, the floorplan alignment component 1406 can receive user input (e.g., via a graphical software program) that identifies a manual alignment between a floorplan model 1402 and structure presented in a satellite image.

In some embodiments, once the floorplan model 1402 of a structure has been aligned with a satellite image of the structure, the projection component 1408 can project aligned scan locations associated with the floorplan model 1402 onto the satellite image of the structure. The geolocation component 108 can then employ the projected locations on the satellite image to determine GPS coordinates corresponding to the projected locations based on the GPS location information associated with the satellite image (e.g., as included in the satellite data 1404 and/or determined from the satellite data 1404). The geolocation component 108 can further assign each (or in some implementations one or more) aligned scan position with their corresponding GPS coordinates. The resulting data can be stored as satellite-based GPS coordinates matched to scan image positions 1410. In other embodiments, based on the alignment between the floorplan model 1402 and a satellite image of the structure, the projection component 1408 can project GPS coordinates associated with one or more locations on the structure in the satellite image (e.g., as provided by the satellite data 1404 and/or determined based on the satellite data 1404) onto the floorplan model 1402. With these embodiments, the geolocation component 108 can then match the projected GPS coordinates to aligned scan positions associated with the floorplan model 1402. The geolocation component 108 can further assign each (or in some implementations one or more) aligned scan position with their corresponding GPS coordinates. The resulting data can be stored as satellite-based GPS coordinates matched to scan image positions 1410.

Figure 15B:
FIG. 15B illustrated projected GPS coordinates projected onto the floorplan model in accordance with one or more embodiments described herein.

For example, FIG. 15B illustrates projected GPS coordinates projected onto the floorplan model 1500 in accordance with one or more embodiments described herein. In the embodiment shown in FIG. 15B, the circles correspond to capture location of scan images that have been associated with GPS coordinates using the techniques described with reference to FIG. 14. As shown in FIG. 15B, the scan locations that have been matched to GPS coordinates can include both indoor and outdoor scan locations. In various embodiments, the floorplan alignment component 1406 can select two or more reference locations (shown in FIG. 15A) on the floorplan model 1402 to facilitate aligning and scaling the floorplan model 1402 with the corresponding image of the structure as presented in the satellite data 1404.

Figure 16:
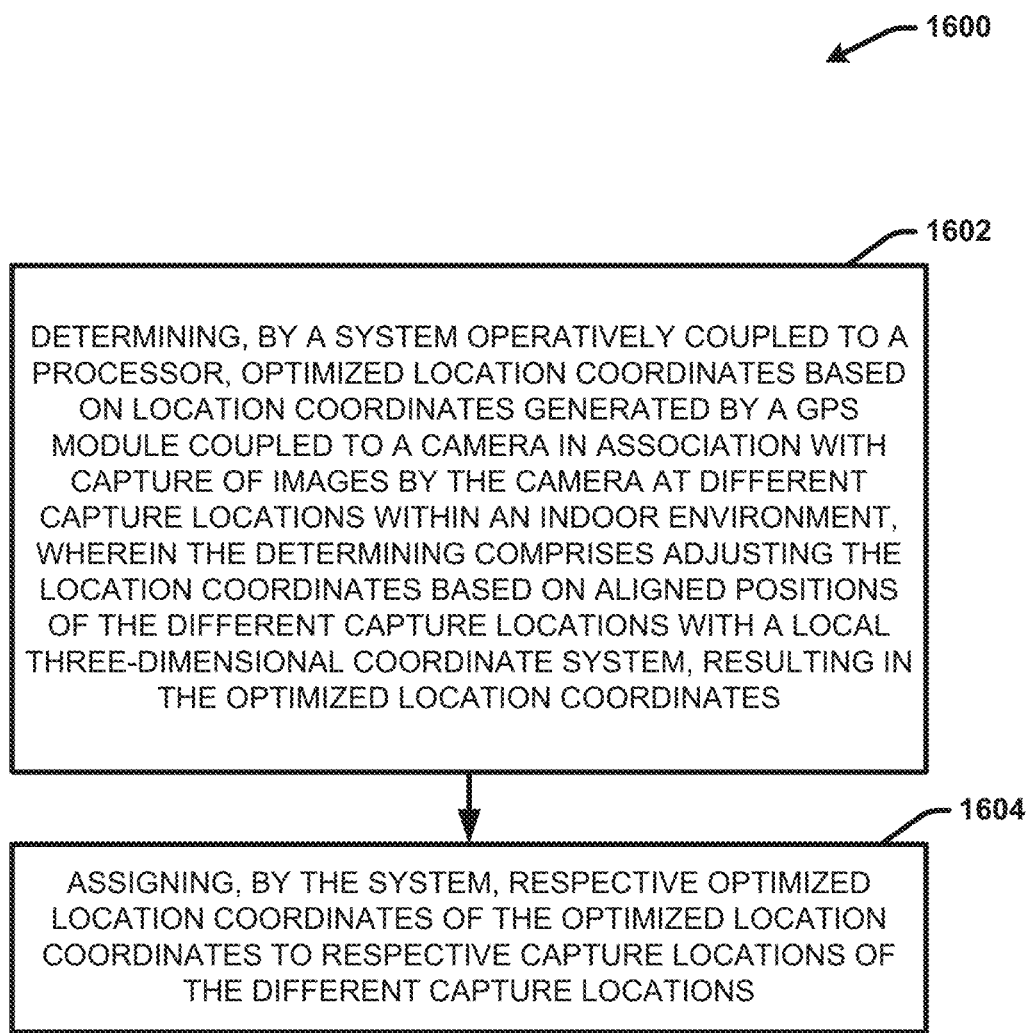
FIG. 16 provides a high-level flow diagram of another example method for improving the accuracy of GPS coordinates of indoor photos in accordance with one or more embodiments described herein.

FIG. 16 provides a high-level flow diagram of another example method 1600 for improving the accuracy of GPS coordinates of indoor photos in accordance with one or more embodiments described herein. Repetitive description of like elements employed in respective embodiments is omitted for sake of brevity.

At 1602, a system operatively coupled to a processor (e.g., system 100), determines optimized location coordinates based on location coordinates generated by a global positioning system module coupled to a camera in association with capture of images by the camera at different capture locations within an indoor environment, wherein the determining comprises adjusting the location coordinates based on aligned positions of the different capture locations with a local 3D system, resulting in the optimized location coordinates. At 1604, the system assigns respective optimized location coordinates of the optimized location coordinates with respective capture locations of the different capture locations (e.g., using geolocation component 108).

Figure 17:
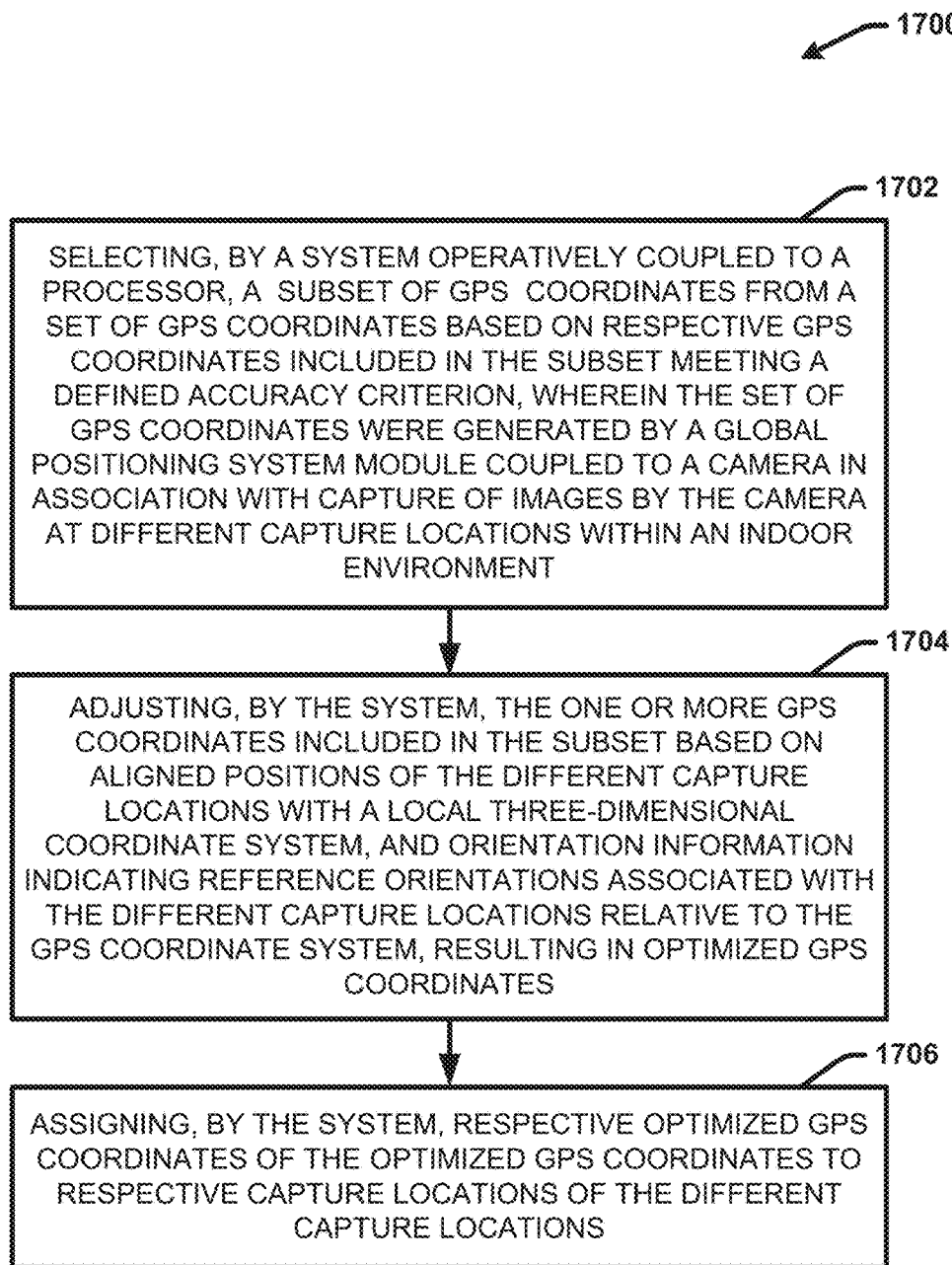
FIG. 17 provides a high-level flow diagram of another example method for improving the accuracy of GPS coordinates of indoor photos in accordance with one or more embodiments described herein.

FIG. 17 provides a high-level flow diagram of another example method 1700 for improving the accuracy of GPS coordinates of indoor photos in accordance with one or more embodiments described herein. Repetitive description of like elements employed in respective embodiments is omitted for sake of brevity.

At 1702, a system operatively coupled to a processor (e.g., system 100), can select a subset of GPS coordinates (e.g., high SNR coordinates) from a set of GPS coordinates based on respective GPS coordinates included in the subset meeting defined accuracy criterion (e.g., via the filtering component 104), wherein the set of GPS coordinates were generated by a global positioning system module coupled (e.g., communicatively coupled, operatively coupled and/or physically coupled) to a camera in association with capture of images by the camera at different capture locations within an indoor environment. At 1704, the system can adjust one or more GPS coordinates included in the subset based on aligned positions of the different capture locations with a local 3D coordinate system, and orientation information indicating reference orientations associated with the different capture locations relative to the GPS coordinate system, resulting in optimized GPS coordinates (e.g., using optimization component 106). At 1706, the system can then assign respective optimized location coordinates of the optimized location coordinates with respective capture locations of the different capture locations (e.g., using geolocation component 108).

Figure 18:
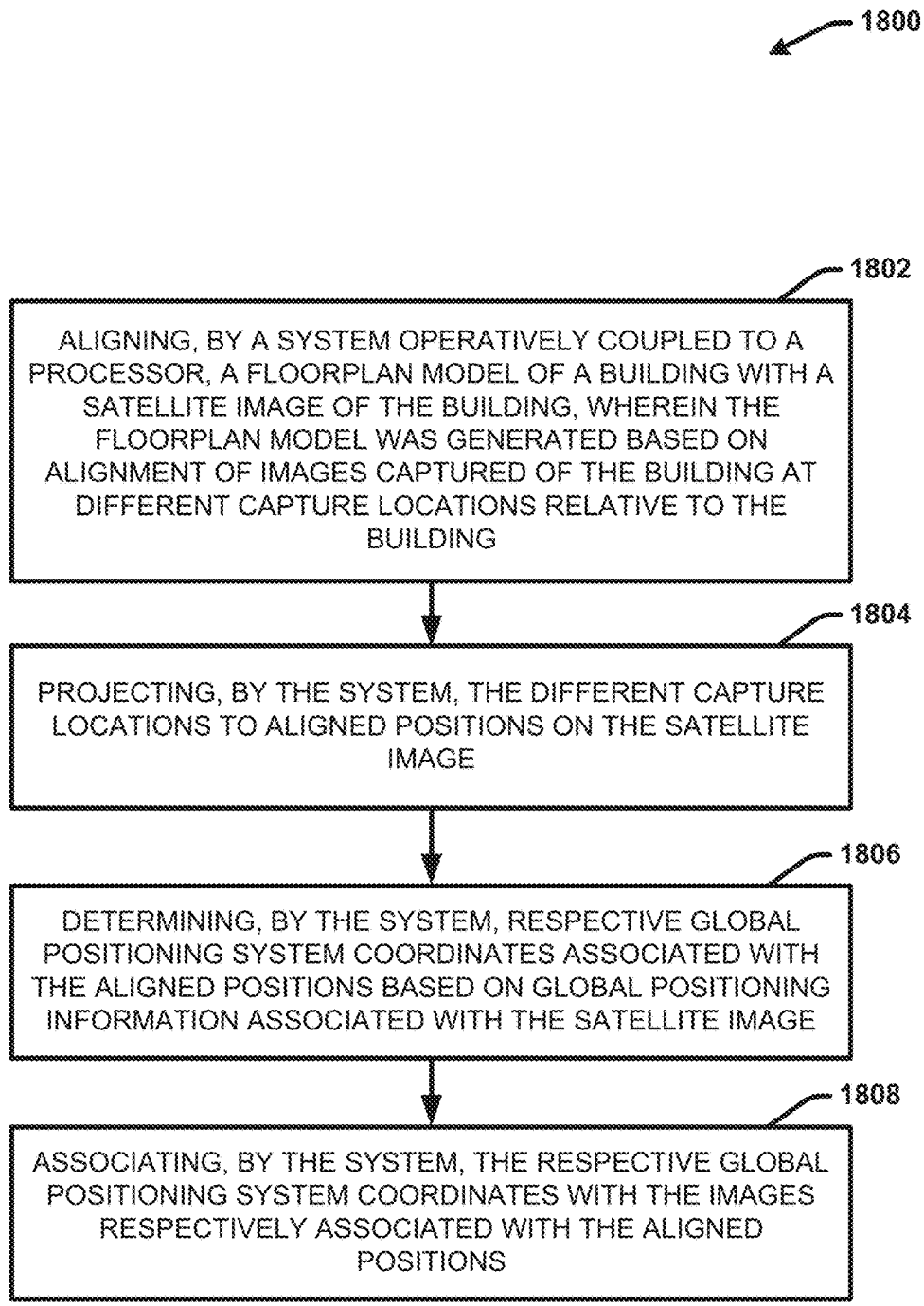
FIG. 18 provides a high-level flow diagram of an example method for determining GPS coordinates for indoor photos captured without GPS data in accordance with one or more embodiments described herein.

FIG. 18 provides a high-level flow diagram of an example method 1800 for determining GPS coordinates for indoor photos captured without GPS data in accordance with one or more embodiments described herein. Repetitive description of like elements employed in respective embodiments is omitted for sake of brevity.

At 1802, a system operatively coupled to a processor (e.g., system 1400), aligns a floorplan model of a building with a satellite image of the building, wherein the floorplan model was generated based on alignment of images captured of the building at different capture locations relative to the building (e.g., using floorplan alignment component 1406). At 1804, the system can project the different capture locations to aligned positions on the satellite image (e.g., using projection component 1408). At 1806, the system can determine respective global positioning system coordinates associated with the aligned positions based on global positioning information associated with the satellite image (e.g., using geolocation component 108), and at 1808, the system can associate the respective global positioning system coordinates with the images respectively associated with the aligned positions (e.g., using geolocation component 108).

II—Automatically Generating External Photos of Structures

Exterior photos of structures are used in various applications such as real-estate applications, virtual tours, mapping and navigation applications, and the like. For example, exterior photos of a house or building are often used as an initial or reference perspective of the structure in real-estate applications. In various implementations in which scans are performed to generate a 3D model of a structure, a collection of interior and exterior images is captured. These images often include panoramic images with FOVs spanning up to 360° horizontally and/or vertically. For example, to ensure that the entire exterior of the structure is captured, 360° panoramic image data is often captured from fixed positions outside of the structure. However, without accurate additional information, such as depth data or manual user input, it is difficult to automatically determine which portion of the scan corresponds to the structure. For example, in many cases there may be more than one structure close by, there may be image data of the road or environment around the structure, and the like.

One or more embodiments of the following subject matter are directed to techniques for automatically (without user guidance) cropping or selecting an exterior image of an environment to generate an image that provides an optimal exterior view of a structure (e.g., a building, a house, etc.) included in the exterior image based in part on GPS coordinates associated with aligned scan positions of indoor images captured inside the structure. In various implementations, the GPS coordinates can include the optimized GPS coordinates 118 and/or the satellite-based GPS coordinates matched to scan image positions 1410 determined in accordance with the techniques described above with reference to Section I.

Figure 19:
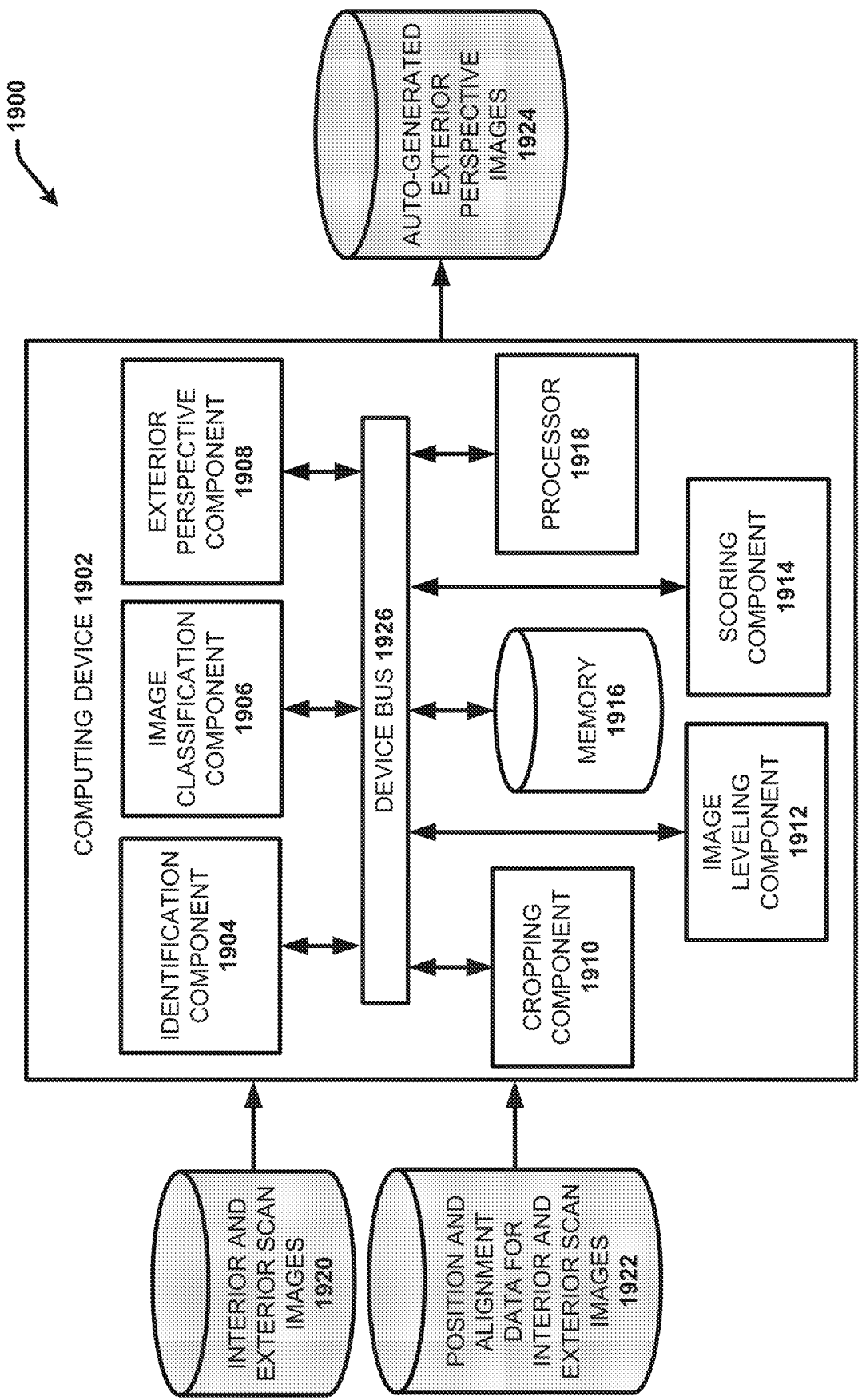
FIG. 19 illustrates a high-level block diagram of an example system for generating exterior photos of a structure based on GPS coordinates of indoor photos of the structure in accordance with one or more embodiments described herein.

FIG. 19 illustrates a high-level block diagram of an example system 1900 for generating exterior photos of a structure based on GPS coordinates of indoor photos (e.g., scan images) of the structure in accordance with one or more embodiments described herein. System 1900 includes a computing device 1902 that includes several machine-executable components, including (but not limited to), identification component 1904, image classification component 1906, exterior perspective component 1908, cropping component 1910, image leveling component 1912, and scoring component 1914. System 1900 also includes various data sources and/or data structures comprising information that can be used/evaluated by one or more components of the computing device 1902 and/or generated by one or more components of computing device 1902. For example, in the embodiment shown, these data sources and/or data structures include interior and exterior scan images 1920, position and alignment data for interior and exterior scan images 1922, and auto-generated exterior perspective images 1924.

The computing device 1902 can further include or be operatively coupled to at least one memory 1916 and at least one processor 1918. The at least one memory 1916 can further store executable instructions (e.g., the identification component 1904, the image classification component 1906, the exterior perspective component 1908, the cropping component 1910, the image leveling component 1912, and/or the scoring component 914), that when executed by the at least one processor 1916, facilitate performance of operations defined by the executable instruction. In some embodiments, the memory 1918 can also store the various data sources and/or structures of system 1900 (e.g., the interior and exterior scan images 1920, position and alignment data for interior and exterior scan images 1922, and auto-generated exterior perspective images 1924 and the like). In other embodiments, the various data sources and structures of system 1900 can be stored in other memory (e.g., at a remote device or system), that is accessible to the computing device 1902 (e.g., via one or more networks, such as the Internet, an intranet, or the like). Computing device 1902 can further include a device bus 1926 that couples the various components of the computing device to one another. Examples of said processor 1916 and memory 1918, as well as other suitable computer or computing-based elements, can be found with reference to FIG. 30, and can be used in connection with implementing one or more of the systems or components shown and described in connection with FIG. 19 or other figures disclosed herein.

The interior and exterior scan images 1920 can include a collection of images captured of a structure, (e.g., a house, a building, etc.), including both interior and exterior images. In various embodiments, the interior and exterior scan images include images captured in association with a scan of the structure, for example, for the purpose of generating a 3D model of the structure. In accordance with these embodiments, the interior and exterior scan images can include panoramic images captures at fixed scan locations inside and outside of the structure. For example, in various implementations in which scans are performed to generate a 3D model of a structure, a collection of interior and exterior images is captured. These images often include panoramic images with FOVs spanning up to 360° horizontally and/or vertically.

Figure 20:
FIG. 20 presents an example equirectangular projection of a panoramic image of an indoor environment in accordance with one or more embodiments described herein.
Figure 21:
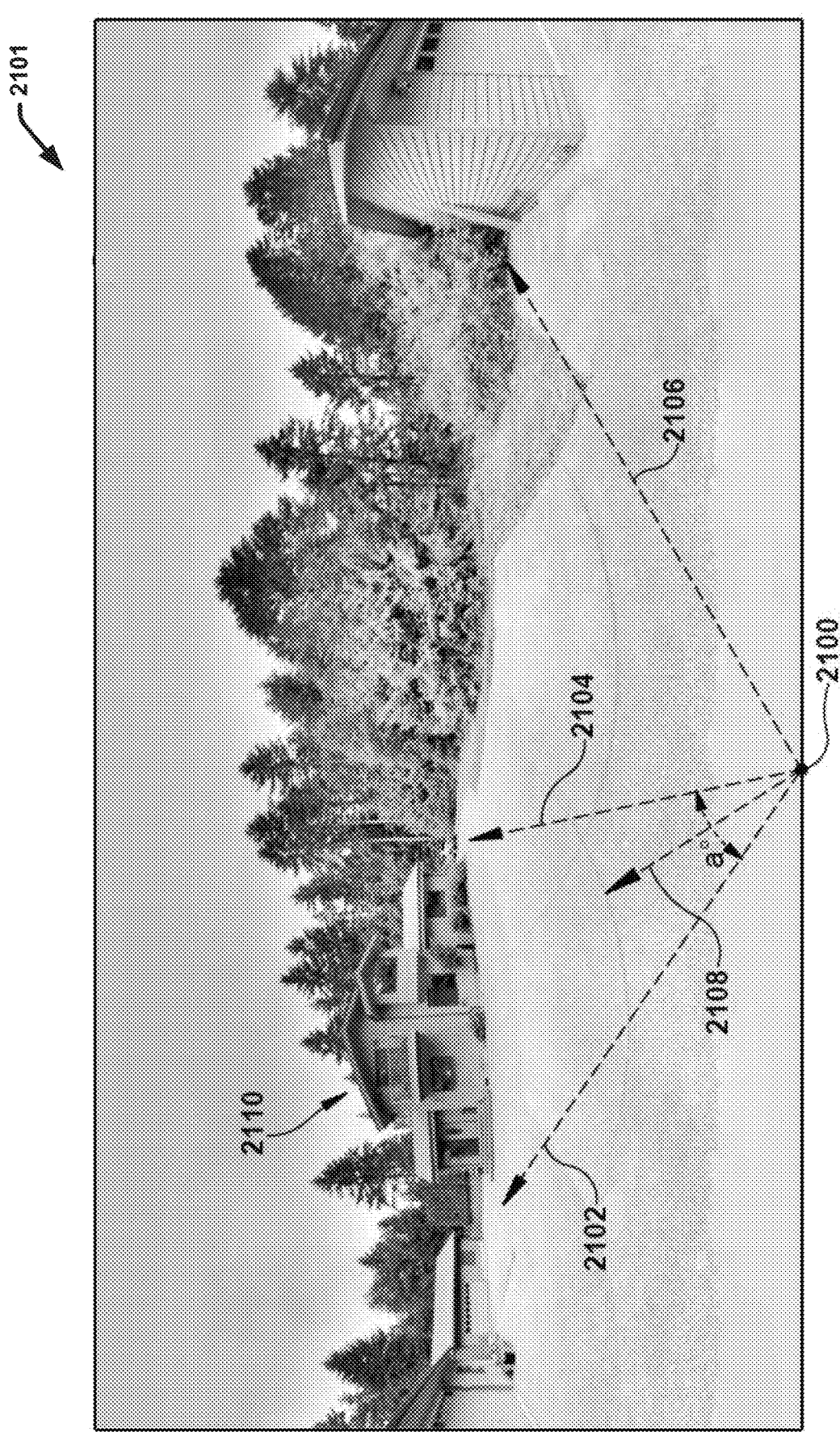
FIG. 21 presents an example equirectangular projection of a panoramic image of an outdoor environment in accordance with one or more embodiments described herein.

For example, FIG. 20 presents an example equirectangular projection of a panoramic image 2001 of an indoor environment in accordance with one or more embodiments described herein. FIG. 21 presents an example equirectangular projection of a panoramic image 2101 of an outdoor environment in accordance with one or more embodiments described herein. The geometry of a panoramic image is different from that of a normal (camera) picture in the aspect that all points along a horizontal (scan) line are equidistant from the camera's focal point. This, in effect, creates a cylindrical or spherical image that only appears correctly when viewed from the exact center of the cylinder. When the image is "unrolled" on a flat surface, such as a computer monitor, the image can have distortions. Such an "unrolled" or flat version of a panoramic image is referred to as an equirectangular projection or equirectangular image.

In this regard, although FIGS. 20 and 21 depict panoramic images as equirectangular projections, panoramic images included in the interior and exterior scan images 1920 can include other forms or representations of panoramic images. For example, the panoramic images can include spherical or cylindrical panoramic images projected onto a 2D plane or a 3D surface (a curved surface). In some implementations, the exterior and/or interior scan images can include panoramic images generated by combining two or more images whose combined fields of view span 360°. With these embodiments, the panoramic image can include or be associated with two or more images captured from a same capture position yet with different fields of view. For example, image data included in the interior and exterior scan images 1920 corresponding to exterior image data captured of a structure can include a final (stitched together) panoramic image generated from two or more images captured at a single scan location, and/or the images as separated from one another. The interior and exterior scan images 1920 can include images with FOV that are less than 360°.

With reference again to FIG. 19, the position and alignment data for interior and exterior scan images 1922 can comprise position information that identifies or indicates relative positions of the interior scan image to the exterior scan images. For example, the position and alignment data can include exterior scan location information corresponding to capture locations of the exterior scan images (included in the interior and exterior scan images 1920) relative to a global positioning coordinate system, and interior scan location information corresponding to interior capture locations, relative to the global positioning coordinate system, of interior scan images (included in the interior and exterior scan images 1920). In various embodiments, the position and alignment data for interior and exterior scan images 1922 can include GPS coordinate location information that provides GPS coordinates (latitude and longitude) for each (or in some implementations one or more) interior scan image included in the interior and exterior scan images 1920, and each (or in some implementations one or more) exterior scan image included in the interior and exterior scan images 1920. The GPS coordinates can correspond to the capture locations of the respective scan images and/or the aligned positions of the scan images relative to one another and a common 3D coordinate space. In various implementations, the GPS coordinates can include the optimized GPS coordinates 118 and/or the satellite-based GPS coordinates matched to scan image positions 1410 determined in accordance with the techniques described above with reference to Section I. By using GPS data to align both indoor and outdoor scan images, the respective images can be accurately aligned to one another in a same coordinate system.

For example, as discussed in Section I, GPS data tends to be significantly more accurate in outdoor environments then indoor environments. Conversely, depth data can be significantly more accurate in indoor environments than outdoor environment (due to IR interference from sunlight, and the extended distance from the camera depth sensor to any object surfaces). Consequently, when multiple indoor scans are taken, the depth data can be used to accurately determine the relative positions of the indoor scans, but not the positions of the scans within the global coordinate system used by GPS. On the other hand, because the depth data associated with outdoor scan images tends to be inaccurate or unavailable, this depth data alone cannot provide for accurately aligning the outdoors scans with the indoors scans. In various implementations, in order to account for these inconsistencies between indoor and outdoor GPS data and indoor and outdoor depth data, the disclosed techniques can employ the optimized GPS coordinates 118 and/or the satellite-based GPS coordinates matched to scan image positions 1410 to accurately determine relative locations between interior scan location and exterior scan locations.

The auto-generated exterior perspective images 1924 can include one or more exterior images selected by and/or generated by the exterior perspective component 1908 and/or the cropping component 1910 based on the exterior scan images included in the interior and exterior scan images 1920. These exterior images can provide an "optimal" view of the exterior of a structure generated without manual input (e.g., generated automatically by the exterior perspective component 1908 and/or the cropping component 1910). In this regard, the "optimal" view refers to a view of the exterior of a target structure that provides a complete and centered view of the entire target structure without cutting off a portion of the structure or including extra/unnecessary image data of the environment around the target structure or another structure.

For example, with reference to FIG. 21, various example perspective views of the panoramic image 2101 are demonstrated as viewed from a hypothetical capture location 2100. The hypothetical capture location 2100 corresponds to a capture location of the panoramic image. However, it is noted that an actual perspective of a panoramic image from its capture location would correspond to the center a cylinder or sphere wherein all horizontal (scan) line are equidistant from the camera's focal point. Accordingly, the geometrical location of the hypothetical perspective location 2100 relative to equirectangular projection form of the panoramic image 2101 shown in FIG. 21 cannot technically represent the actual capture location of the panoramic image. The hypothetical capture location 2100 is merely used to exemplify various aspects of the disclosed techniques for generating optimal views of a panoramic image. In this regard, in the embodiment shown, the panoramic image 2101 of the exterior environment includes a centered view of the house 2110 between projection lines 2102 and 2104. However, the perspective of the panoramic image 2101 between projection lines 2104 and 2106 merely includes landscape that may be part of a yard or side lot adjacent to the house 2110. In accordance with this example, the "optimal" view/perspective of the panoramic image would clearly include the view/perspective between projection lines 2102 and 2104 over the view/perspective between projection lines 2104 and 2106 (which does not include any of the house 2110). In accordance with this example, the "optimal view" of the exterior structure (e.g., the target structure which in this case is the house 2110) comprises a view/perspective of the panoramic image with a FOV and an orientation (e.g., corresponding to a rotation of a virtual camera from the hypothetical capture location 2100) that provides a centered perspective of the target structure while providing a "reasonable frame" of sky and landscape around the structure. Technique for determining and defining an "optimal view" and a "reasonable frame" are described in greater detail infra with reference to the exterior perspective component 1908.

With reference again to FIG. 19, in one or more embodiments, the identification component 1904 can identify and extract exterior images included in the interior and exterior scan images 1920 for processing by the computing device to generate the auto-generated exterior perspective images. For example, in some implementations, the interior and exterior scan images 1920 can be associated with metadata that classifies the respective images as either being an interior image or an exterior image of a structure. In accordance with these embodiments, the identification component 1904 can be configured to select and extract all of the exterior images for a same target structure (e.g., associated with a same building, house, etc.) for processing. This technique is suitable for structures associated with a limited number of exterior scans (e.g., one to five for example).

In other implementations in which a plurality of exterior scan points and corresponding images are associated with a structure, the identification component 1904 can employ defined selection criterion to select a subset (e.g., including one or more) of the exterior images for processing. The subset can be fixed at a defined number or vary based on the structure and the selection criteria applied. For example, in some embodiments, the selection criteria can be based on relative locations of the exterior images to one another. According to these embodiments, the identification component 1904 can employ the position and alignment data for interior and exterior scan images 1922 to determine the relative positions of the exterior images to one another and the structure (e.g., the center of the structure, the front of the structure, the perimeter of the structure, etc.). For instance, in one implementation, the identification component 1904 can be configured to identify and select an exterior image for processing based on the exterior image having the farthest location from the structure. In another example, the selection criterion can comprise a predefined optimal distance from the structure and the identification component 1904 can identify and select the exterior image having a position closest to the optimal distance. In another example, the selection criteria can be tailored to facilitate selection of two images that provide different perspectives of the exterior of the structure. For example, the identification component 1904 can be configured to identify and select exterior images that are positioned on opposite sides of the structure. According to this example, the identification component 1904 can be configured to select two exterior images, one corresponding to the front of a structure and another corresponding to the back, four exterior images corresponding to four sides of a rectangular structure, and so on. In another example, the selection criteria can be tailored to facilitate selection of two or more images that are located around a defined perimeter of the structure and separated from one another by a minimum distance.

In other embodiments in which the exterior scan images are not labeled with metadata identifying them as exterior images of the structure, the image classification component 1906 can provide for classifying images as exterior or interior images. The identification component 1904 can then apply the classification assigned by the image classification component 1906 to identify and select the exterior images for processing. In some implementations, the image classification component 1906 can also determine and associate metadata with the exterior images indicating whether they provide a view of the front, side, or back of the structure. For example, exterior scans generally have no depth data, low depth data, or poor-quality depth data associated therewith relative to interior scans. For instance, interior scans have depth data available for most of the FOV. Thus, in some embodiments, the image classification component 1906 can determine whether an image included in the interior and exterior scan images 1920 is an exterior image of a structure or an interior image of the structure based on the amount and/or quality of the depth data associated therewith. With these embodiments, the depth data associated with the respective images can be included as metadata with the images as provided in the interior and exterior scan images 1920 and/or provided in the position and alignment data for the interior and exterior scan images.

The image classification component 1906 can also employ one or more machine learning classification models to facilitate automatically classifying images as interior or exterior images of a structure. For example, the image classification models can include neural network models, deep neural network models, and the like that are configured to classify images of a structures as being an exterior image or an interior image. In some implementations, the machine learning image classification models can further provide for determining and associating information with an exterior image of a structure that identifies the view of the structure (e.g., front side of the structure, backside of the structure, sideview, aerial view, etc.), that defines a measure of quality of the image, that indicates a relative capture position off the image relative to the structure (e.g., depth information), that indicates an amount of the structure included in the image, and the like. In some embodiments, the one or more machine learning models can also be configured score exterior images based on one or more criteria (e.g., perspective of the structure, image quality, capture location, amount of structure included in the image, etc.), with a score that represents a level strength/quality of the image as a good or bad candidate for processing by exterior perspective component 1908 and the cropping component 910. With these embodiments, the selection component 1904 can be configured to select exterior images for processing based on their associated scores (e.g., select the top "n" highest scored images, select images having a score exceeding a defined threshold score, or the like).

The exterior perspective component 1908 can determine an optimal perspective of an exterior scan image including a target structure based at least in part on the relative (capture) position of the exterior scan image to the interior capture locations within the target structure. In various embodiments, this can involve determining a portion of the exterior image that provides an optimal view of a target structure (e.g., a structure included in the exterior scan image) based on a perspective of the exterior image from the capture location of the exterior image that maximizes inclusion of the interior capture locations. For example, the exterior image can include an image with an original FOV (e.g., 360° in implementations in which the exterior image is a panoramic image) that includes image data of a target structure. The exterior perspective component 1908 can determine a portion of the exterior image that corresponds to a smaller FOV than the original FOV and maximizes inclusion of the interior scan locations. The cropping component 1910 can further crop the exterior image based on the portion to generate an image of the exterior of the building from the optimal perspective. This cropped exterior image can thus become one of the auto-generated exterior perspective images that represents the structure.

For example, with reference again to FIG. 21, the exterior perspective component 1908 can determine a perspective of the panoramic image 2101 from the hypothetical capture location 2100 that corresponds rotating a virtual camera horizontally and/or vertically at the capture location to an orientation relative to the panoramic image 2101 that aims the virtual camera directly at the target structure, the house 2110, so as to center the target structure in the view, (which in this case is the main house excluding the garage). The perspective also includes a FOV component. In this regard, in addition to rotation of the virtual camera to an optimal orientation, the exterior perspective component 1908 can also determine a FOV for the virtual camera that results in a view of the structure that includes the entire structure (e.g., without cutting off a portion of the target structure) and provides a reasonable frame of image data corresponding to the environment around the target structure (e.g., image data excluding image data that corresponds to the structure itself), such as the a portion of the driveway, sky and area on other sides of the house 2110). In accordance with this example, the optimal FOV corresponds to a°, and the optimal orientation corresponds to an orientation corresponding to vector 2108.

In one or more embodiments, in order to determine the optimal perspective of a target structure included in an exterior image and/or the portion of the exterior image that provides the optimal perspective of the target structure, the exterior perspective component 1908 can determine the relative locations of the capture position of the exterior image to all interior capture locations (e.g., using the position and alignment data for interior and exterior scan images). The exterior perspective component 1908 can then select an optimal perspective based on a minimum FOV that results in including all (or as much as possible based on a maximum allowed FOV) of the interior capture locations. In this regard, by including all of the interior capture locations in the FOV, the exterior perspective component 1908 can ensure that most or all of the exterior of the structure is included in the selected portion of the exterior image. The cropping component 1910 can then crop the exterior image based on the optimal perspective, which includes or corresponds to a determined orientation and FOV for the virtual camera that results in maximizing inclusion of the interior capture locations from the exterior capture location. The resulting cropped image can thus correspond to a virtual snapshot of only the relevant portion of the exterior image that provides the optimal perspective of the target structure. In this regard, creating a virtual snapshot based on a perspective of virtual camera relative to an exterior panorama from the capture location corresponds to cropping an exterior panorama (and changing the panorama from an equirectangular projection or whatever projection is being used) to a perspective projection. The location of the cropped area is determined by the rotation of the virtual camera, and the size of the cropped area depends on the horizontal and vertical FOV of the virtual camera.

FIGS. 22-26 exemplify the disclosed techniques for determining an optimal perspective of a target object using panoramic image 2101 and house 2110 as an example. Repetitive description of like elements employed in respective embodiments is omitted for sake of brevity.

Figure 22:
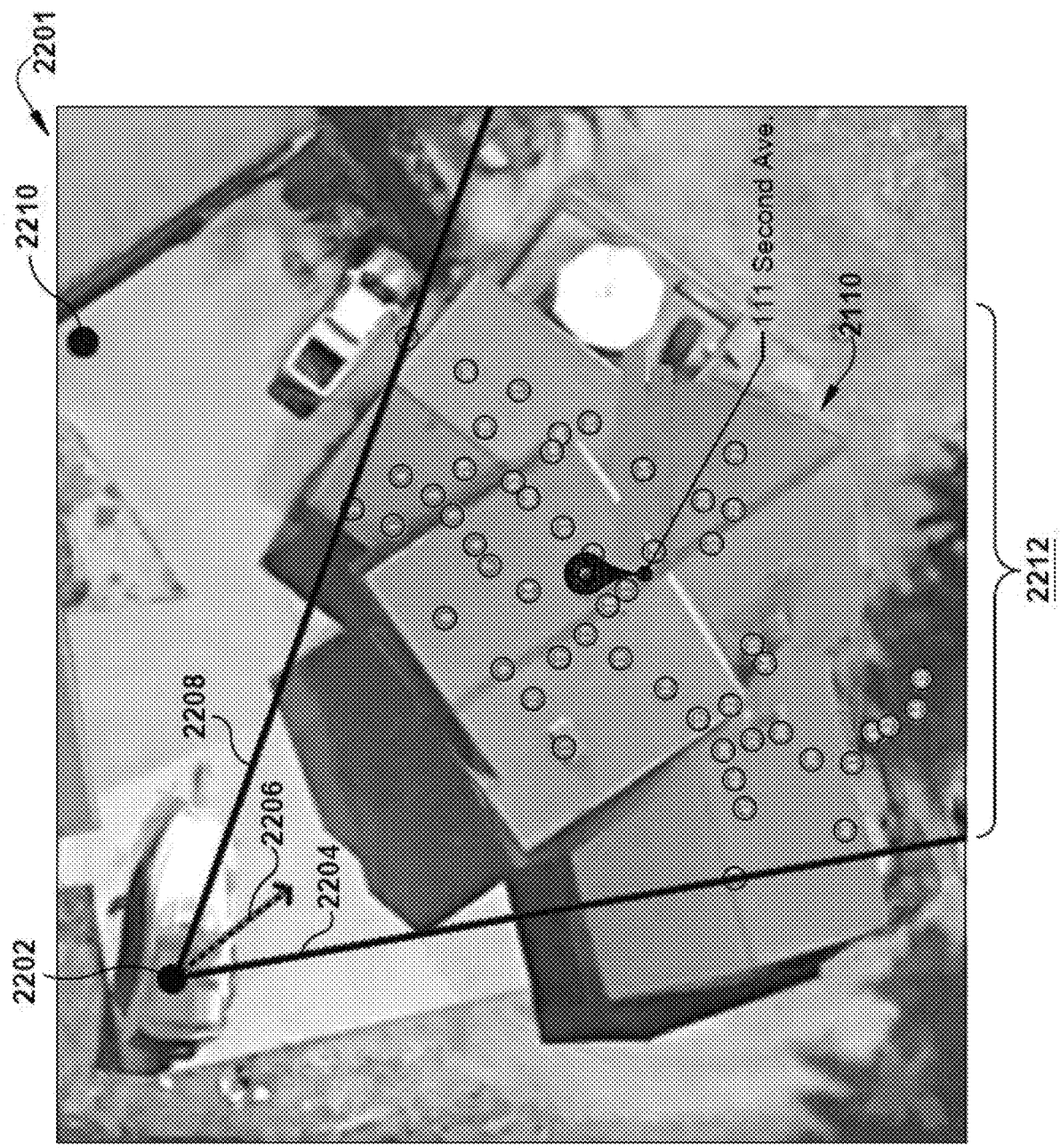
FIG. 22 presents an example aerial view of a building including projected indoor and outdoor image capture locations in accordance with one or more embodiments described herein.

With reference to FIG. 22 in view of FIGS. 19 and 21, FIG. 22 presents an example aerial view 2201 of a building including projected indoor and outdoor image capture locations in accordance with one or more embodiments described herein. In accordance with this example, the building corresponds to the house 2110 depicted in panoramic image 2101. The circles correspond to capture location of interior images relative to a global positing coordinate system. In various embodiments, the circles correspond to GPS coordinates matched with capture locations of interior scan images. For example, in some embodiments, the circles include optimized GPS coordinates generated in accordance with the techniques described in Section I that have been matched to interior capture locations of interior scan images. Circle 2202 and circle 2210 respectively correspond to exterior capture locations of exterior scan images relative to the global positioning coordinate system. In this regard, circles 2202 and 2210 can respectively correspond to GPS coordinates of exterior capture locations of exterior scan images. In some implementations, these GPS coordinates can also be optimized GPS coordinates determined in accordance with the techniques described with reference to Section I. In various embodiments, the exterior scan images generated at positions corresponding to circles 2202 and 2210 include panoramic images. In accordance with this example implementation, circle 2202 can correspond to the capture location 2100 of panoramic image 2101.

Projection lines 2404 and 2208 represent the smallest FOV that encapsulates all interior scan locations, collectively identified in FIG. 22 as interior scan locations 2212. The orientation of the virtual camera at the capture location 2100 (circle 2202) corresponds to vector 2206 which is directly centered between projection lines 2204 and 2208. In various embodiments, when evaluating an exterior image to determine the optimal perspective of the target structure, the exterior perspective component 1908 can first determine projection lines corresponding to projection lines 2204 and 2208, which correspond to the minimum FOV that provides a view of all interior capture locations. From this minimum FOV, the exterior perspective component 1908 can determine the virtual camera orientation based on a vector from the exterior capture location that that is centered within the minimum FOV (e.g., a vector that results in dividing the minimum FOV in half).

Figure 23:
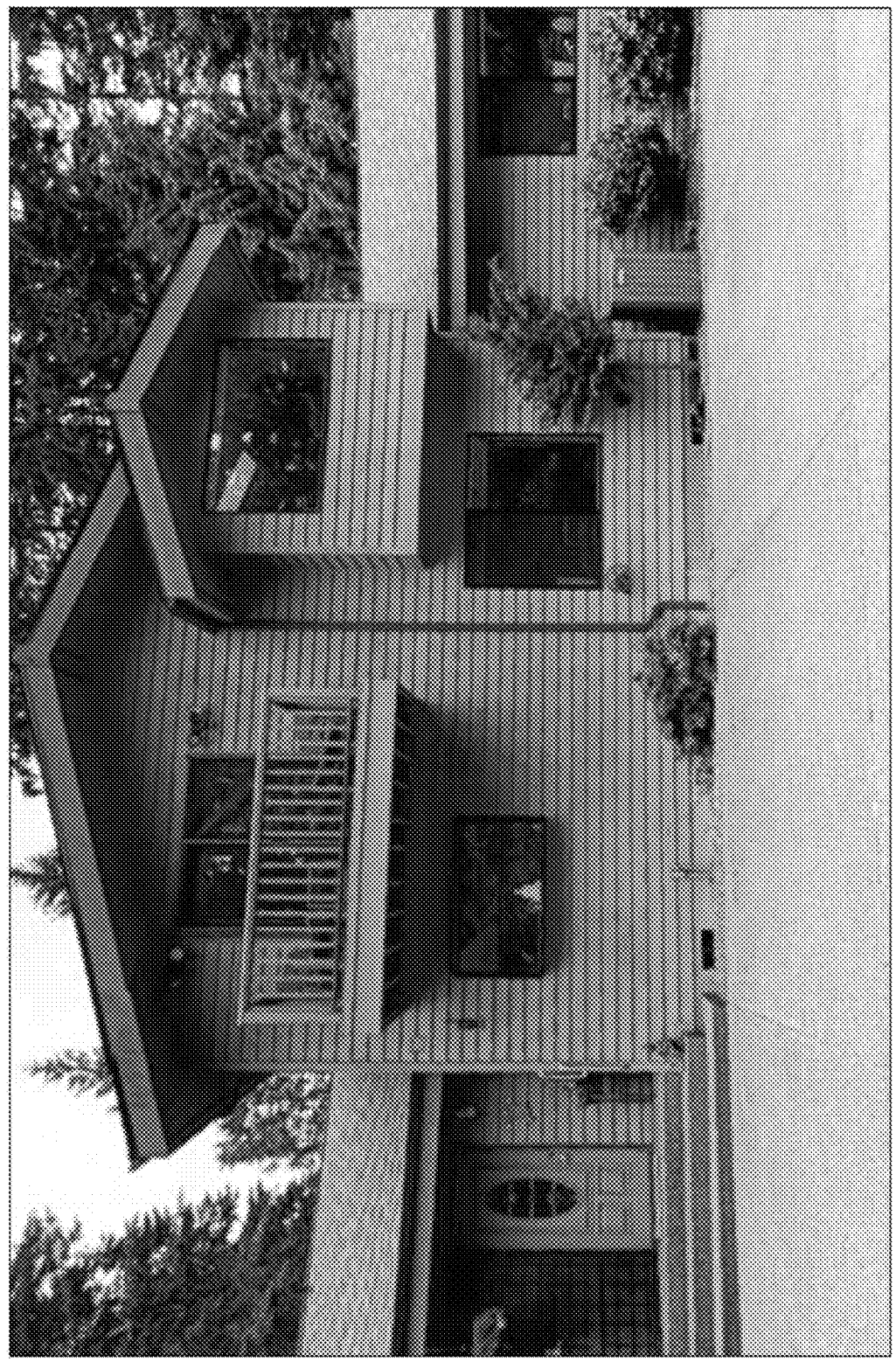
FIG. 23 presents an example exterior image generated based on auto-cropping of an exterior panoramic image in accordance with one or more embodiments described herein.

FIG. 23 presents an example exterior image 2301 generated based on auto-cropping (e.g., by cropping component 1910) of panoramic image 2101 based on the minimum FOV shown in FIG. 22. As can be seen with reference to exterior image 2301, the minimum FOV in this case results in cutting out portions of the sides of the target structure. Thus, the minimum FOV is too narrow. This will likely be the case in most scenarios because all interior capture locations will be located within the outermost walls of the structure.

In order to account for this constraint, the exterior perspective component 1908 can employ various techniques to increase the minimum FOV to an optimal FOV that provides a centered view of the target structure without cutting off portions of the target structure. For example, in some embodiments, the exterior perspective component 1908 can be configured to increase the minimum FOV a fixed amount. In another embodiment, the exterior perspective component 1908 can be configured to increase the minimum FOV an amount that results in the portion of the exterior corresponding to the FOV to have an optimal ratio of building image data to environmental image data. In this regard, the building data can comprise image data that includes structural elements of the target structure and the environmental data can include all other image data excluding the building data. For example, the environmental data can include sky, landscape, driveway, roads, other structures, detached objects from the target structure and the like. The exterior perspective component 1908 can also be configured to evaluate the exterior image to define a boundary between the building data and the environment data, determine an area corresponding to the building data and the environmental data, and increase the minimum FOV so that the ratio of the area of the building data to the area of the environmental data reaches the optimal ratio. The optimal ratio can be fixed or determined using machine learning. In another embodiment, the exterior perspective component 1908 can be configured to increase the minimum FOV such that a border or margins including only environmental data and having fixed dimensions are provided on all four sides of a rectangular area comprising the target structure. In some implementations, the exterior perspective component 1908 can be also be constrained by a maximum FOV that the exterior perspective component 1908 can increase the minimum FOV.

Figure 24:
FIG. 24 presents another example exterior image generated based on auto-cropping of an exterior panoramic image in accordance with one or more embodiments described herein.

FIG. 24 presents another example exterior image 2401 generated based on auto-cropping (e.g., by cropping component 1910) of panoramic image 2101 based on increasing the minimum FOV shown in FIG. 22. As can be seen with reference to exterior image 2401, by slightly increasing the minimum FOV (in accordance with one or more of the criteria discussed above), the resulting exterior image 2401 provides a nice centered perspective of the entire house without cutting off any of the house.

Figure 25:
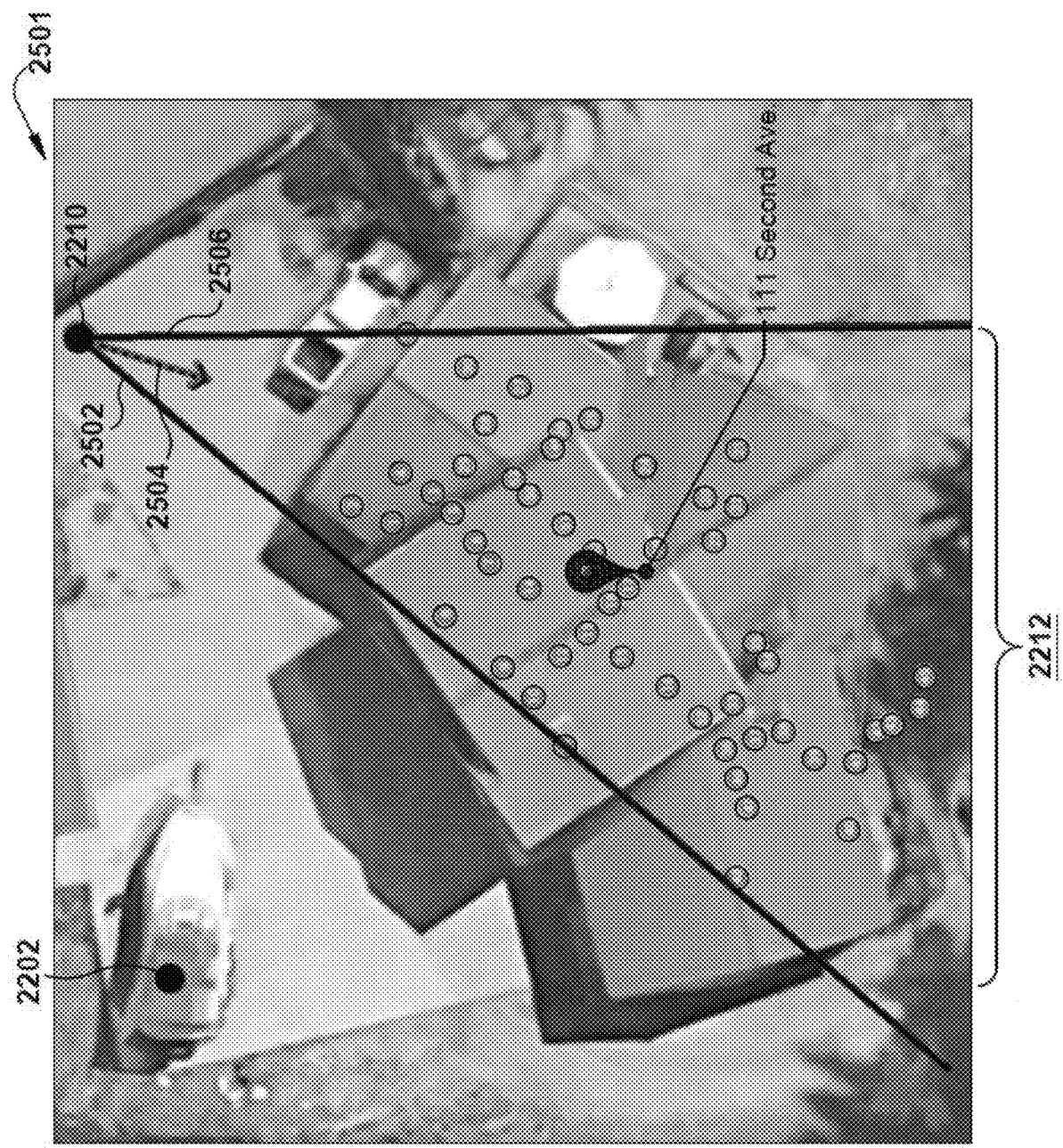
FIG. 25 presents another example aerial view of a building including projected indoor and outdoor image capture locations in accordance with one or more embodiments described herein.

FIG. 25 presents another example aerial view 2501 of the house 2110 depicted in panoramic image 2101. View 2501 is the same as view 2201 with the modification of the position from which the exterior image being evaluated was captured. In this regard, aerial view 2501 demonstrate determining an optimal perspective for viewing an exterior of the house included in an exterior image captured from capture position corresponding to circle 2210. In accordance with this example implementation, projection lines 2502 and 2506 represent the smallest FOV that encapsulates all interior scan locations 2212. The orientation of the virtual camera at the exterior capture location (circle 2210) corresponds to vector 2504.

Figure 26:
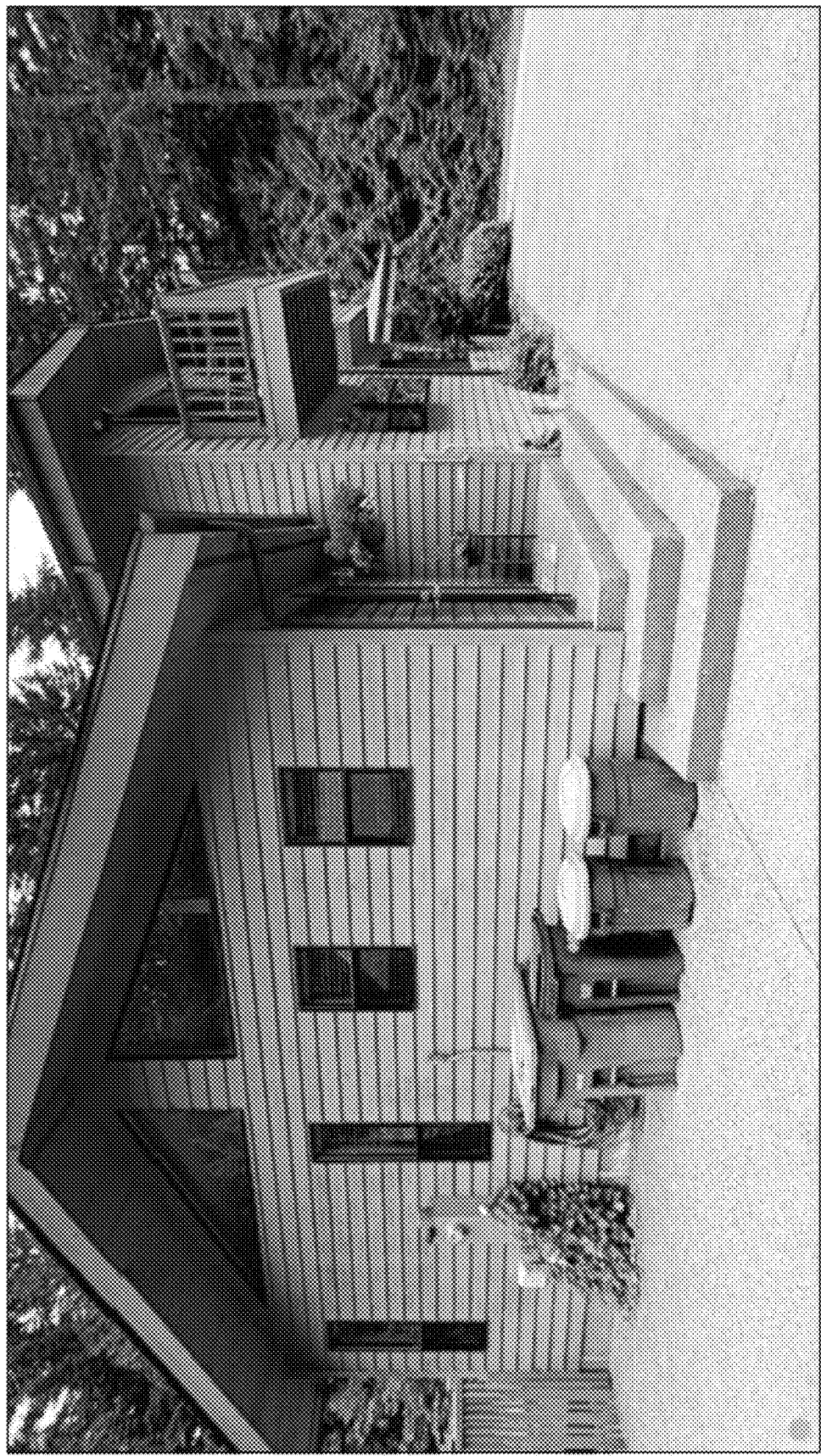
FIG. 26 presents another example exterior image generated based on auto-cropping of an exterior panoramic image in accordance with one or more embodiments described herein.

FIG. 26 presents an example exterior image generated based on auto-cropping of panoramic image 2101 based on the perspective determined in FIG. 25 while slightly increasing the minimum FOV. Although various example implementations are described herein with reference to cropping a panoramic image, the subject techniques can be applied to 2D image with FOV less than 360° horizontally and/or vertically.

With reference again to FIG. 19, in some embodiments, after or in association with cropping an exterior image based on the optimal perspective determined by the exterior perspective component 1908, the image leveling component 1912 can rotate the cropped image relative to a ground plane based on a gravity vector associated with the exterior image to level the image. In this regard, to ensure the cropped image is level (in cases where the camera was not level, for example), a gravity vector calculated from one or more sensors coupled to the camera used to capture the exterior image can be used by the image leveling component 1912.

For example, in various implementations, the camera can include an IMU that captures data during rotation of the camera in association with capture of a panoramic image. These IMU measurements can be used to determine the camera's gravity vector which can in turn be used to level the cropped image. This can reduce the adverse effect of various sources of error (e.g., a poorly calibrated sensor) that affects the accuracy of the final gravity vector for a scan.

In the embodiments described above, the exterior perspective component 1908 can determine an "optimal" view of an exterior structure included in an exterior image based on a minimum FOV that maximizes inclusion of the interior scan locations, wherein the minimum FOV is increased using various techniques/criteria to ensure part of the structure is not "cut-off" in the cropped image. In one or more additional embodiments, system 1900 can further include a scoring component 1914 that further facilitates selecting the "best" cropped images of an exterior structure based on various possible options for cropping a single exterior image of the structure as well as various different available images of the structure included in the interior and exterior scan images 1920. With these embodiments, the exterior perspective component 1908 and the cropping component 1910 can generate several candidate auto-cropped images of an exterior of a structure generated from one or more different exterior images including image data of the structure using the techniques described herein. The scoring component 1908 can further score the respective images based on one or more component criteria, including but not limited to: FOV, orientation, distance of the exterior camera location and the interior camera locations, quality of the image data, ratio of structure data to environmental data, and the like. For example, in some implementations, the scores determined for the respective images can be a function of combined components scores determined for the respective components. The scores determined for the respective images can reflect predefined scoring and weighting schemes for the respective components regarding how values for the respective components positively or negatively affect their respective component scores. In some embodiments, the scoring component 1908 can employ one or more machine learning techniques to determine the scores based on the respective components. The total score determined for the respective images can reflect an overall level of preference toward the image as being an optimal image of the exterior of the structure. For example, candidate images with higher scores can be selected over images with lower scores to represent the structure in an external database, to represent the structure in an external application (e.g., a real-estate application), and the like.

Figure 27:
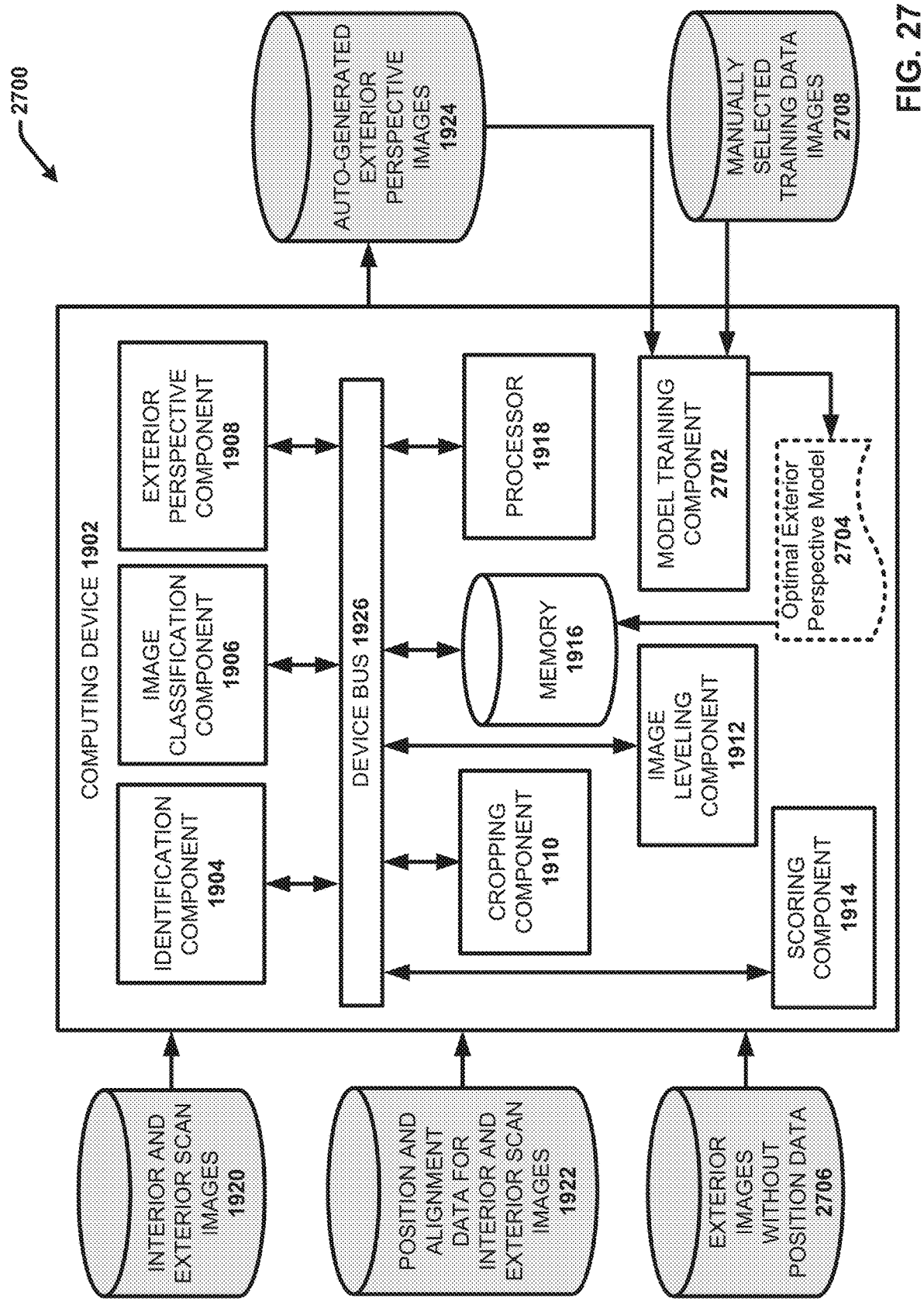
FIG. 27 illustrates a high-level block diagram of another example system for generating exterior photos of a structure without GPS coordinates for indoor photos of the structure in accordance with one or more embodiments described herein.

FIG. 27 illustrates a high-level block diagram of another example system 2700 for generating exterior photos of a structure without GPS coordinates for indoor photos of the structure in accordance with one or more embodiments described herein. System 2700 can include same or similar components as system 1900 with the addition of exterior images without position data 2706, model training component 2702 and optimal exterior perspective model 2704. Repetitive description of like elements employed in respective embodiments is omitted for sake of brevity.

The techniques described above work for exterior images of structures that are associated with position information (e.g., GPS coordinates) that has been or can be aligned with position information (e.g., also GPS coordinates) for interior capture locations of interior images of the structures. System 2700 provides additional techniques for automatically generating exterior perspective images of structures from images without this position data. For example, system 2700 provides techniques for automatically evaluating any exterior image of a structure using one or more machine learning techniques to determine how to crop the image to automatically generate an optimal image of the structure.

For example, in one or more embodiments, the resulting auto-generated exterior perspective images 1924 generated based on the techniques described above can be used as training data to train a machine learning model, referred to herein as the optimal exterior perspective model 2704 to automatically determine optimal exterior views of structures included in exterior images without position data 2706. In some implementations, in addition to and/or alternative to the auto-generated exterior perspective images 1924, the training data images can also include exterior images were manually selected (e.g., by photographers, by users, etc.). In the embodiment shown, this additional training data is identified as manually selected training data images 2708. For example, the manually selected training data images can include images that have been manually selected as examples of optimal exterior perspectives of structures, and/or example images labeled as "bad" perspectives of exterior structures.

Figure 28:
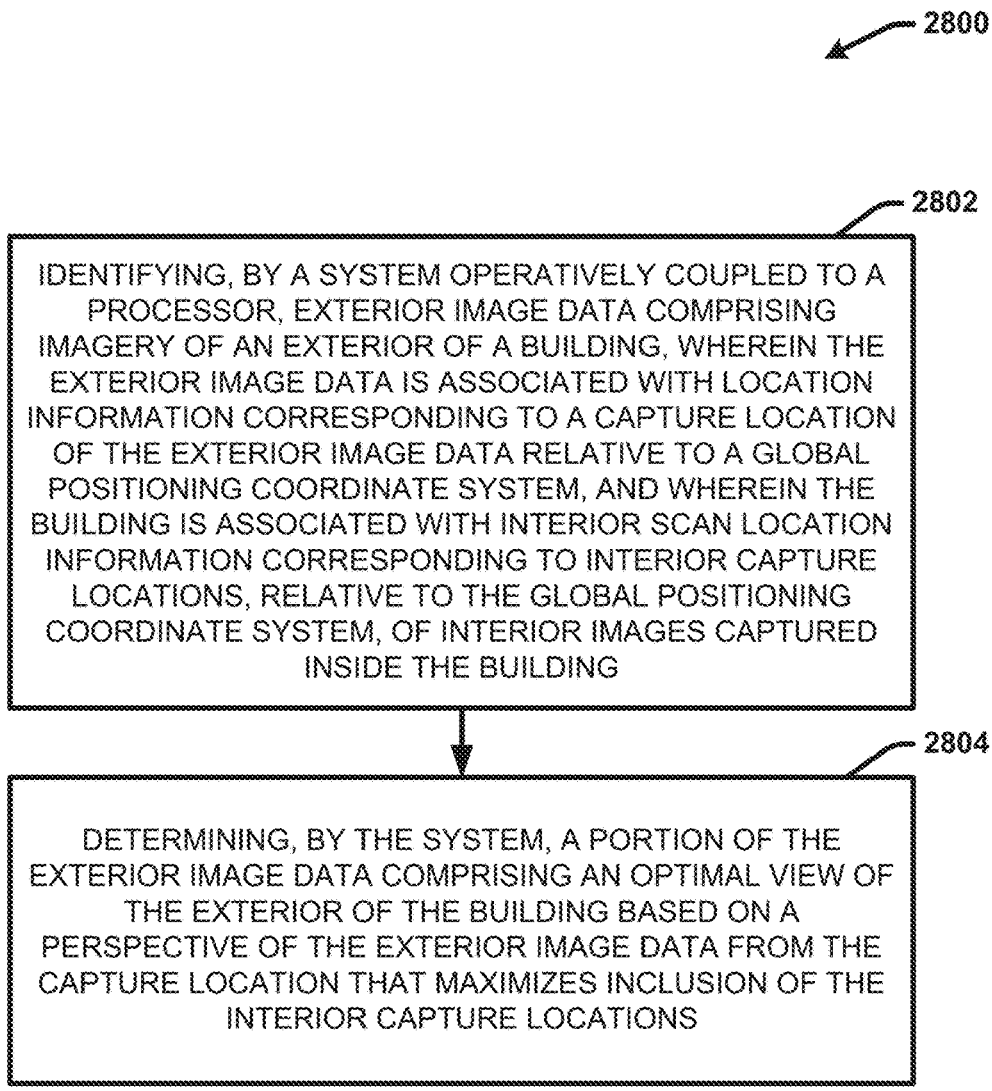
FIG. 28 presents a high-level flow diagram of an example method for generating exterior photos of a structure based on GPS coordinates for indoor photos of the structure in accordance with one or more embodiments described herein.

Using the training data images, (e.g., the auto-generated exterior perspective images 1924) and/or the manually selected training data images 2708), the model training component 2702 can develop and train the optimal exterior perspective model 2704 to classify (e.g. using one or more classifies) preferred exterior views of structures included exterior images. The trained model can then be applied by the exterior perspective component 1908 to evaluate images from cameras without GPS and related sensor data to identify desirable exterior building images (e.g., from exterior images without position data 2706). This classifier can further be improved by expanding the training set to include images of building exteriors, sourced from other 2D camera systems. Together, these techniques allow reliable creation of desirable exterior building images, with no user interaction. The GPS/IMU technique can be used alone or in conjunction with the machine learning technique. It is appreciated that multiple machine learning techniques could be employed, including machine learning, deep learning and other forms of artificial intelligence FIG. 28 presents a high-level flow diagram of an example method 2800 for generating exterior photos of a structure based on GPS coordinates for indoor photos of the structure in accordance with one or more embodiments described herein. Repetitive description of like elements employed in respective embodiments is omitted for sake of brevity.

At 2802, a system operatively coupled to a processor, (e.g., system 1900, system 2700 or the like), can identify exterior image data (e.g., a panoramic image) comprising imagery of an exterior of a building (e.g., using identification component 1904), wherein the exterior image data is associated with location information corresponding to a capture location of the exterior image data relative to a global positioning coordinate system, and wherein the building is associated with interior scan location information corresponding to interior capture locations, relative to the global positioning coordinate system, of interior images captured inside the building. At 2804, the system can determine a portion of the exterior image data comprising an optimal view of the exterior of the building based on a perspective of the exterior image data from the capture location that maximizes inclusion of the interior capture locations (e.g., using exterior perspective component 1908 and/or the optimal exterior perspective model 2704).

Figure 29:
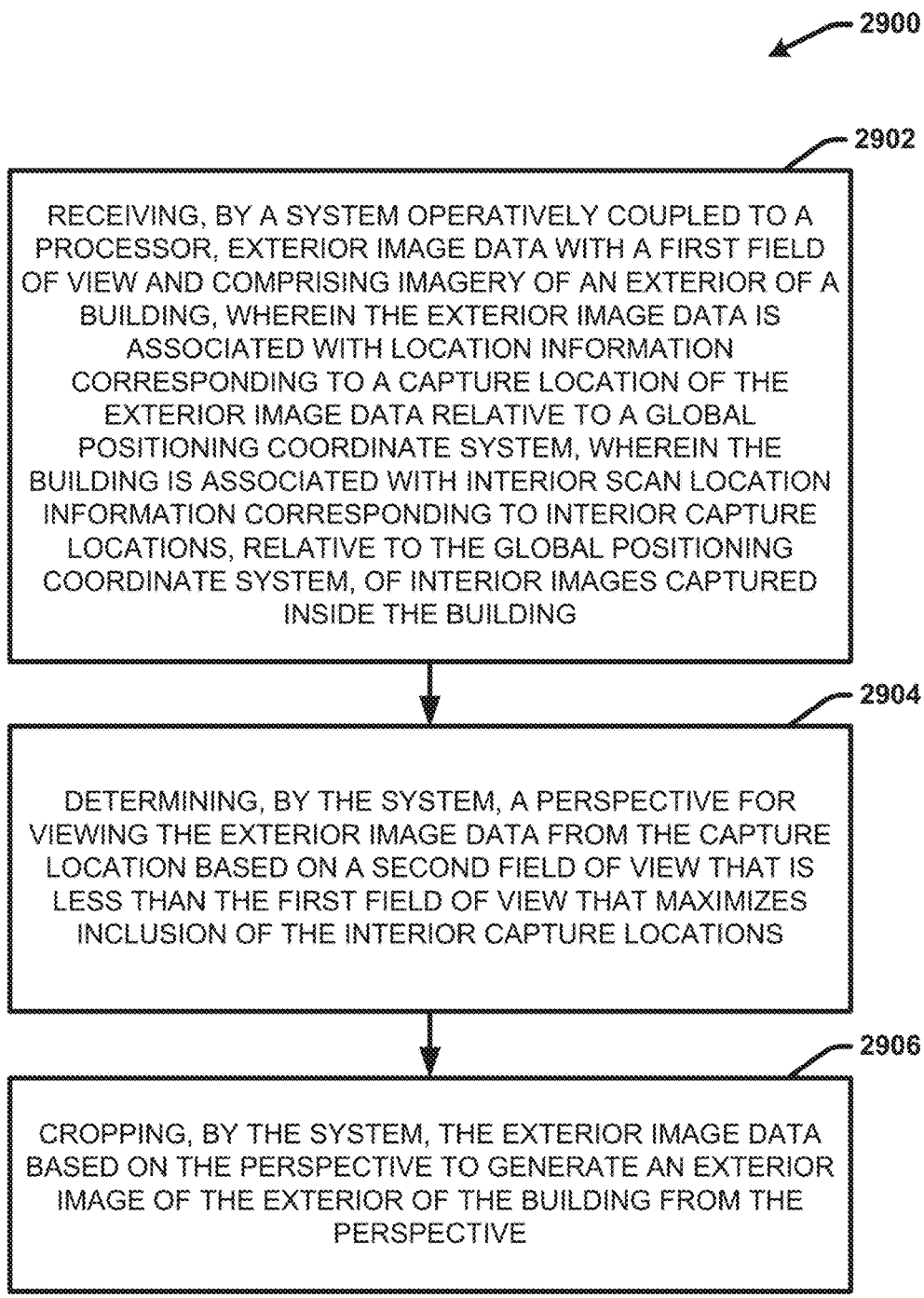
FIG. 29 presents a high-level flow diagram of another example method for generating exterior photos of a structure based on GPS coordinates for indoor photos of the structure in accordance with one or more embodiments described herein.

FIG. 29 presents a high-level flow diagram of another example method 2900 for generating exterior photos of a structure based on GPS coordinates for indoor photos of the structure in accordance with one or more embodiments described herein.

At 2902, a system operatively coupled to a processor, (e.g., system 1900, system 2700 or the like), can receive exterior image data (e.g., a panoramic image) comprising imagery of an exterior of a building (e.g., from identification component 1904 or otherwise provided to the system from an external data source), wherein the exterior image data is associated with location information corresponding to a capture location of the exterior image data relative to a global positioning coordinate system, and wherein the building is associated with interior scan location information corresponding to interior capture locations, relative to the global positioning coordinate system, of interior images captured inside the building. At 2904, the system can determine a portion of the exterior image data comprising an optimal view of the exterior of the building based on a perspective of the exterior image data from the capture location that maximizes inclusion of the interior capture locations (e.g., using exterior perspective component 1908 and/or the optimal exterior perspective model 2704). At 2906, the system can crop the exterior image data to generate an exterior image of the exterior of the building from the perspective (e.g., using cropping component 1910).

III—Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 30, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 30:
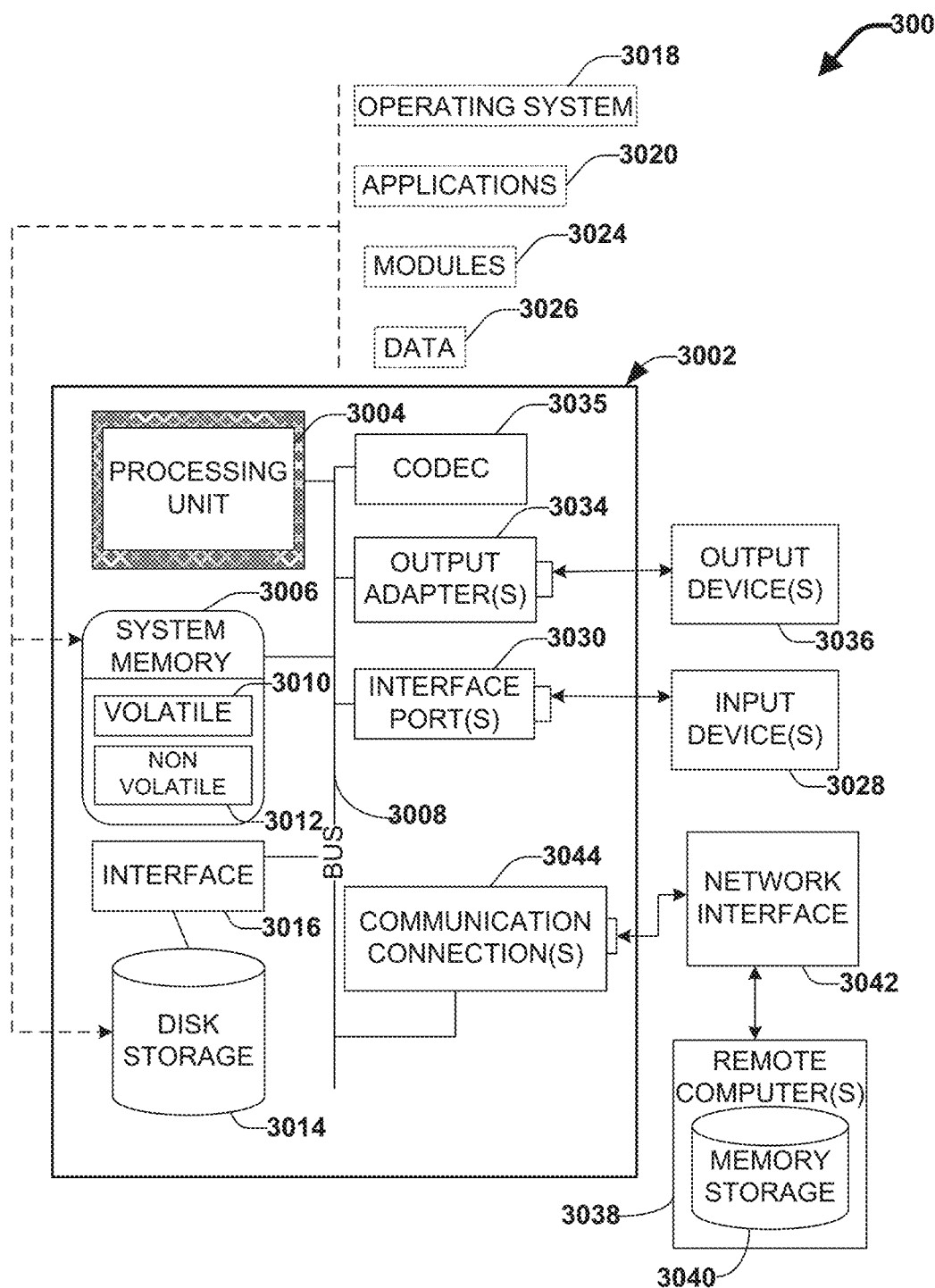
FIG. 30 illustrates a block diagram of an example, non-limiting operating environment in which one or more embodiments described herein can be facilitated.

With reference to FIG. 30, an example environment 3000 for implementing various aspects of the claimed subject matter includes a computer 3002. The computer 3002 includes a processing unit 3004, a system memory 3006, a codec 3035, and a system bus 3008. The system bus 3008 couples system components including, but not limited to, the system memory 3006 to the processing unit 3004. The processing unit 3004 can be any of various available processors. Dual microprocessors and other multiprocessor architectures also can be employed as the processing unit 3004.

The system bus 3008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 3006 includes volatile memory 3010 and non-volatile memory 3012, which can employ one or more of the disclosed memory architectures, in various embodiments. The basic input/output system (BIOS), containing the basic routines to transfer information between elements within the computer 3002, such as during start-up, is stored in non-volatile memory 3012. In addition, according to present innovations, codec 3035 can include at least one of an encoder or decoder, wherein the at least one of an encoder or decoder can consist of hardware, software, or a combination of hardware and software. Although, codec 3035 is depicted as a separate component, codec 3035 can be contained within non-volatile memory 3012. By way of illustration, and not limitation, non-volatile memory 3012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 3012 can employ one or more of the disclosed memory devices, in at least some embodiments. Moreover, non-volatile memory 3012 can be computer memory (e.g., physically integrated with computer 3002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 3010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 3002 can also include removable/non-removable, volatile/non-volatile computer storage medium. FIG. 30 illustrates, for example, disk storage 3014. Disk storage 3014 includes, but is not limited to, devices like a magnetic disk drive, solid state disk (SSD), flash memory card, or memory stick. In addition, disk storage 3014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3014 to the system bus 3008, a removable or non-removable interface is typically used, such as interface 3016. It is appreciated that disk storage 3014 can store information related to a user. Such information might be stored at or provided to a server or to an application running on a user device. In one embodiment, the user can be notified (e.g., by way of output device(s) 3036) of the types of information that are stored to disk storage 3014 or transmitted to the server or application. The user can be provided the opportunity to opt-in or opt-out of having such information collected or shared with the server or application (e.g., by way of input from input device(s) 3028).

It is to be appreciated that FIG. 30 describes software that acts as an intermediary between users and the basic computer resources described in the suitable operating environment 3000. Such software includes an operating system 3018. Operating system 3018, which can be stored on disk storage 3014, acts to control and allocate resources of the computer system 3002. Applications 3020 take advantage of the management of resources by operating system 3018 through program modules 3024, and program data 3026, such as the boot/shutdown transaction table and the like, stored either in system memory 3006 or on disk storage 3014. It is to be appreciated that the claimed subject matter can be implemented with various operating systems or combinations of operating systems.

A user enters commands or information into the computer 3002 through input device(s) 3028. Input devices 3028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3004 through the system bus 3008 via interface port(s) 3030. Interface port(s) 3030 include, for example, a serial port, a parallel port, a game port, and a universal serial bus (USB). Output device(s) 3036 use some of the same type of ports as input device(s) 3028. Thus, for example, a USB port can be used to provide input to computer 3002 and to output information from computer 3002 to an output device 3036. Output adapter 3034 is provided to illustrate that there are some output devices 3036 like monitors, speakers, and printers, among other output devices 3036, which require special adapters. The output adapters 3034 include, by way of illustration and not limitation, video and sound cards that provide a means of connection between the output device 3036 and the system bus 3008. It should be noted that other devices or systems of devices provide both input and output capabilities such as remote computer(s) 3038.

Computer 3002 can operate in a networked environment using logical connections to one or more remote computers, such as remote computer(s) 3038. The remote computer(s) 3038 can be a personal computer, a server, a router, a network PC, a workstation, a microprocessor based appliance, a peer device, a smart phone, a tablet, or other network node, and typically includes many of the elements described relative to computer 3002. For purposes of brevity, only a memory storage device 3040 is illustrated with remote computer(s) 3038. Remote computer(s) 3038 is logically connected to computer 3002 through a network interface 3042 and then connected via communication connection(s) 3044. Network interface 3042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3044 refers to the hardware/software employed to connect the network interface 3042 to the bus 3008. While communication connection 3044 is shown for illustrative clarity inside computer 3002, it can also be external to computer 3002. The hardware/software necessary for connection to the network interface 3042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor; and
a memory containing executable instructions, the executable instructions being executable by the processor to:
determine aligned image capture positions of a camera at a first subset of capture locations with a local three-dimensional system, the first subset of capture locations being within an indoor environment and an outdoor environment;
receive location coordinates of the camera generated by a global positioning system module coupled to the camera in association with capture of images by the camera at a second subset of capture locations within the outdoor environment;
determine optimized location coordinates by adjusting the location coordinates of the camera generated by the global positioning system module based on the aligned image capture positions, resulting in the optimized location coordinates; and
assign at least one optimized location coordinate of the optimized location coordinates to related at least one capture location of the second subset of capture locations.

2. The system of claim 1, wherein the executable instructions being further executable by the processor to:
select a subset location coordinates of the camera based on second location coordinates of the camera included in the subset meeting a defined precision criterion, wherein the location coordinates of the camera comprise the subset of second location coordinates of the camera selected from a set of first location coordinates of the camera that were generated by the global positioning system module in association with the capture of the images by the camera.

3. The system of claim 2, wherein the defined precision criterion comprises a minimum signal-to-noise ratio of received satellite signals of the global positioning system associated with the second location coordinates of the camera.

4. The system of claim 2, wherein the defined precision criterion comprises a maximum position dilution of precision value associated with the second location coordinates of the camera.

5. The system of claim 1, wherein the aligned image capture positions were determined based on depth data associated with the images as captured at the related capture locations.

6. The system of claim 1, wherein the location coordinates are in a global positioning coordinate system, and wherein the adjusting the location coordinates is a function of a transformation between the local three-dimensional system and the global positioning coordinate system.

7. The system of claim 1, wherein the adjusting the location coordinates of the camera uses an optimization problem that optimizes an alignment between the aligned image capture positions of the first subset of capture locations and the location coordinates.

8. The system of claim 7, wherein the optimization problem comprises a cost function that penalizes the location coordinates based on error limitations associated with the location coordinates, and wherein the error limitations are based on position dilution of precision values associated with the location coordinates.

9. The system of claim 1, wherein the location coordinates of the camera are in a global positioning coordinate system, wherein the related capture locations are associated with orientation information indicating reference orientations of the related capture locations in the global positioning coordinate system, and determining the optimized location coordinates is based on the orientation information.

10. The system of claim 9, wherein the adjusting the location coordinates of the camera using an optimization problem that optimizes an alignment between the aligned image capture positions of the related capture locations and respective location coordinates of the location coordinates of the camera, and the reference orientations associated with the related capture locations.

11. The system of claim 10, wherein the optimization problem comprises a cost function that penalizes the location coordinates based on differences between the reference orientations and actual orientations of the location coordinates in the global positioning coordinate system.

12. The system of claim 9, wherein the executable instructions being further executable by the processor to:
calibrate magnetometer data to transform the magnetometer data into orientation information, orientation information being generated based on magnetometer data generated by a magnetometer coupled to the camera.

13. The system of claim 12, wherein the calibrate the magnetometer data based on at least one of: relative tilt of the magnetometer to a ground plane, hard iron effect, or soft iron effect.

14. A method comprising:
determining, by a system operable coupled to a processor, aligned image capture positions of a camera at a first subset of capture locations with a local three-dimensional system, the first subset of capture locations being within an indoor environment and an outdoor environment;
receiving, by the system, location coordinates of the camera generated by a global positioning system module coupled to the camera in association with capture of images by the camera at a second subset of capture locations within the outdoor environment;
determining optimized location coordinates by adjusting the location coordinates of the camera generated by the global positioning module based on the aligned image capture positions, resulting in the optimized location coordinates; and
assigning, by the system, at least one optimized location coordinate of the optimized location coordinates to related at least one capture location of the second subset of capture locations.

15. The method of claim 14 further comprising:
selecting, by the system, a subset of second location coordinates of the camera based on second location coordinates of the camera included in the subset meeting a defined precision criterion, wherein the location coordinates of the camera comprise the subset of second location coordinates of the camera selected from a set of first location coordinates of the camera that were generated by the global positioning system module in association with the capture of the images by the camera.

16. The method of claim 15, wherein the defined precision criterion is selected from a group consisting of, a minimum signal-to-noise ratio of received satellite signals of the global positioning system associated with the second location coordinates of the camera, and a maximum position dilution of precision value associated with the second location coordinates of the camera.

17. The method of claim 14, wherein the aligned image capture positions were determined based on depth data associated with the images as captured at the related capture locations.

18. The method of claim 14, wherein the location coordinates of the camera are in a global positioning coordinate system, and wherein the adjusting comprises adjusting the location coordinates of the camera as a function of a transformation between the local three-dimensional system and the global positioning coordinate system.

19. The method of claim 14, wherein the adjusting comprises adjusting the location coordinates of the camera using an optimization problem that optimizes an alignment between the aligned image capture positions of the related capture locations and location coordinates of the camera.

20. The method of claim 19, wherein the optimization problem comprises a cost function that penalizes the location coordinates of the camera based on error limitations associated with the location coordinates, wherein the error limitations are based on position dilution of precision values associated with the location coordinates of the camera.

21. The method of claim 14, wherein the location coordinates of the camera are in a global positioning coordinate system, wherein the related capture locations are associated with orientation information indicating reference orientations of the related capture locations in the global positioning coordinate system, and wherein determining the optimized location coordinates is based on the orientation information.

22. The method of claim 21, wherein the adjusting comprises adjusting the location coordinates of the camera using an optimization problem that optimizes an alignment between the aligned image capture positions of the related capture locations and respective location coordinates of the location coordinates of the camera and the reference orientations associated with the related capture locations.

23. The method of claim 22, wherein the optimization problem comprises a cost function that penalizes the location coordinates based on differences between the reference orientations and actual orientations of the location coordinates in the global positioning coordinate system.

24. A non-transitory machine-readable storage medium, comprising executable instructions that, when executed by a processor, facilitate performance of operations, comprising:
determining aligned image capture positions of a camera at a first subset of capture locations with a local three-dimensional system, the first subset of capture locations being within an indoor environment and an outdoor environment;
receiving location coordinates of the camera generated by a global positioning system module coupled to the camera in association with capture of images by the camera at a second subset of capture locations within the outdoor environment;
determining optimized location coordinates by adjusting the location coordinates of the camera generated by the global positioning module based on the aligned image capture positions, resulting in the optimized location coordinates; and
assigning at least one optimized location coordinate of the optimized location coordinates to related at least one capture location of the second subset of capture locations.

25. The non-transitory machine-readable storage medium of claim 24, wherein the location coordinates of the camera are in a global positioning coordinate system, wherein the related capture locations are associated with orientation information indicating reference orientations of the related capture locations in the global positioning coordinate system, and wherein determining the optimized location coordinates is based on the orientation information.

26. The non-transitory machine-readable storage medium of claim 25, wherein determining adjustments to the location coordinates of the camera uses an optimization problem that optimizes an alignment between the related capture locations and at least one location coordinates of the location coordinates of the camera based on the aligned image capture positions of the related capture locations and the reference orientations associated with the related capture locations.

* * * * *